United States Patent [19]

McCormack et al.

[11] Patent Number: 6,049,773
[45] Date of Patent: Apr. 11, 2000

[54] AUTOMATED METHOD FOR IDENTIFICATION OF REINSURANCE CLAIMS

[75] Inventors: Douglas R. McCormack, Thunder Bay, Canada; James S. McCormack, Gahanna, Ohio

[73] Assignee: Reclaim Technology and Services Limited, Newark, Ohio

[21] Appl. No.: 08/943,298

[22] Filed: Oct. 14, 1997

[51] Int. Cl.[7] .................................................. G06F 17/60
[52] U.S. Cl. ................................................. 705/4; 705/7
[58] Field of Search ............................. 705/4, 7, 10, 35, 705/36, 2; 706/925, 52, 21, 60, 47; 707/104

[56] References Cited

U.S. PATENT DOCUMENTS

| | | | |
|---|---|---|---|
| 4,766,539 | 8/1988 | Fox | 705/4 |
| 5,361,201 | 11/1994 | Jost et al. | 705/35 |
| 5,504,674 | 4/1996 | Chen et al. | 705/4 |
| 5,577,169 | 11/1996 | Prezioso | 706/52 |
| 5,724,488 | 3/1998 | Prezioso | 706/52 |
| 5,761,442 | 6/1998 | Barr et al. | 705/36 |
| 5,839,113 | 11/1988 | Federau | 705/4 |

OTHER PUBLICATIONS

Reinsurance by Carter, Merchantile I General Reinsurance Co. pp. 3–12, 59–71 (1979).
Reinsurance Fundamentals and Current Issues by Gastel et al Insurance Information Inst. pp. 10–23 (1983).
Underwriting Decisions by Ayling, Gower Publishing pp. 3–14 (1984).
Operations of Life and Health Insurance by Higgins, LOMA, pp. 210–216 (1986).
Way, Paul, "Home Insurance Discovers AI is AOK", Insurance & Technology Magazine, vol. 22, No. 10, pp. 36–40, Oct. 1997.
"New Artificial Intelligence Software Seeks—and Finds—Reinsurance Recoveries for Insurers", Property & Casualty Insurance Magazine, May/Jun. 1997.
Nordman, Eric C.; Piazza, Rich; "Catastrophe Modeling From a Regulatory Perspective", Journal of Insurance Regulation, vol. 15, No. 3, pp. 360–371, Spring 1997.
Jablonowski, Mark, "A New Perspective on Risk", CPCU Journal, vol. 49, No. 4, pp. 225–236, Winter 1996.

*Primary Examiner*—Emanuel Todd Voeltz
*Assistant Examiner*—George D. Morgan
*Attorney, Agent, or Firm*—Mueller and Smith, L.P.A.

[57] ABSTRACT

An automated method for identifying those claims of a raw claims insurance claims database for which reinsurance is applicable. The method develops a database of uniquely clustered catastrophic events such as storm reports. This "CatNodes" database may be developed manually or automatically through the use of a neural network approach. A fuzzy degree of belonging is employed to quantify the likelihood that a given insurance claim is properly associated with a given catastrophic event or storm. The assignment of a degree of belonging is derived by approaches which consider four factors: the date of the loss; the location of the loss; the type of the loss; and the presence of special keywords in the claim description.

39 Claims, 22 Drawing Sheets

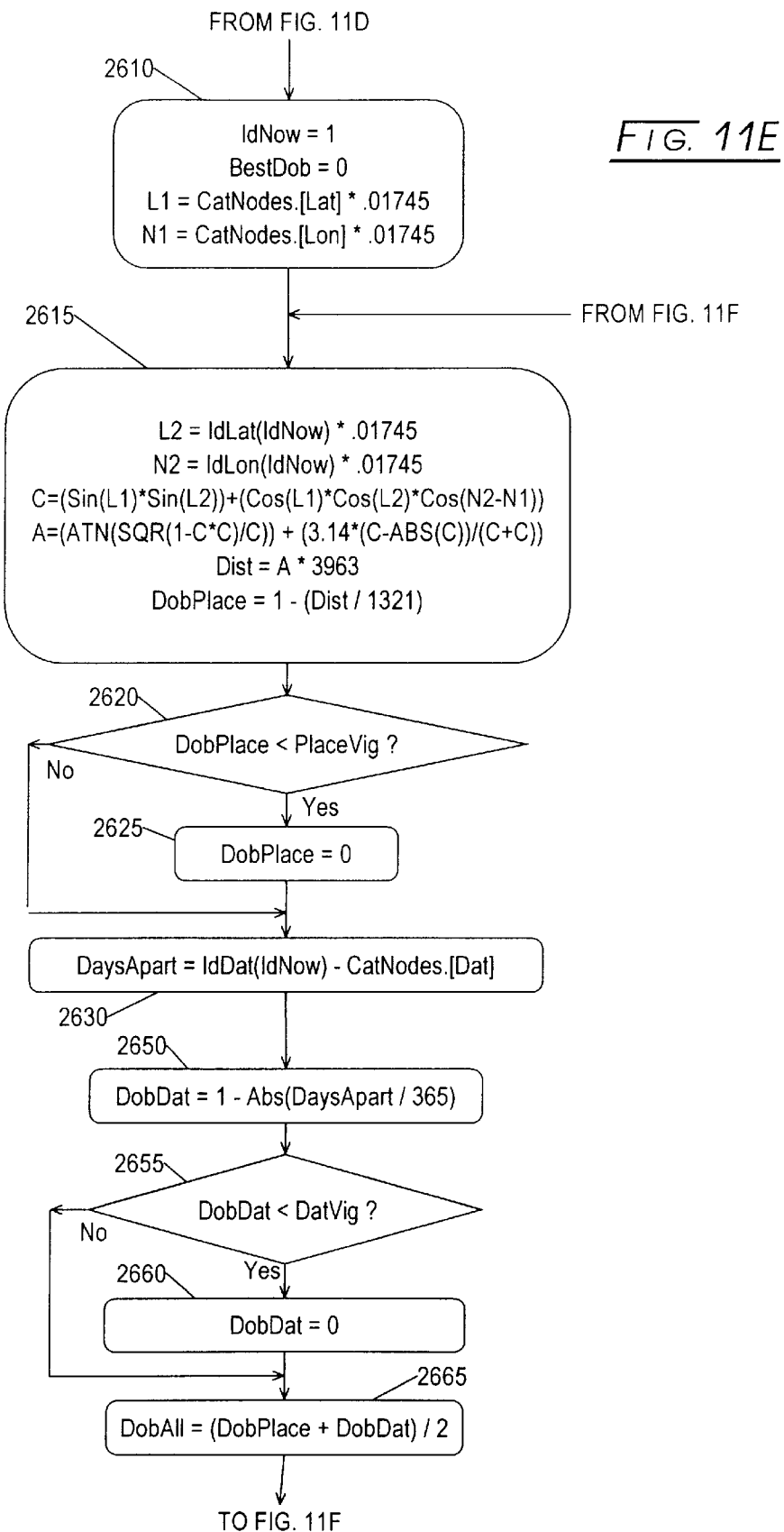

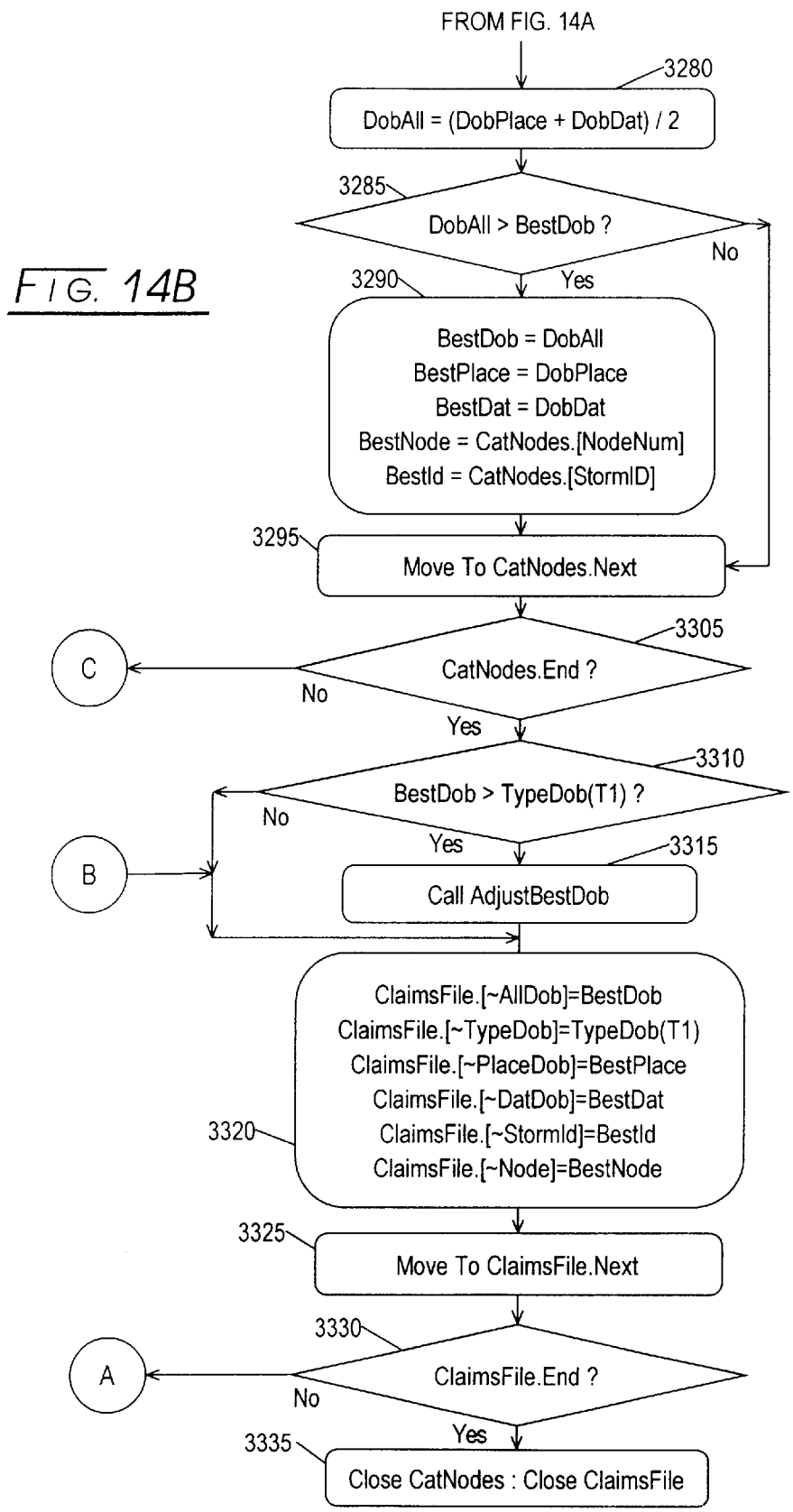

Claim List For Catastrophe 950079

Claims With:
- ☑ Untagged CATS
- ☑ Taggged CATS

| Claim | Cat Tag | City Name | State | Loss Date | Loss Type | $ Amount | DOB | Keeper |
|-------|---------|-----------|-------|-----------|-----------|----------|-----|--------|
| 44704 |         | 6331 CEDARWO | MS | May-04-95 | Glass, Sign, B&I | 5,097. | 97 |   |
| 17302 |         | CARROLLTON | TX | May-04-95 | Fire, Explosion | 81,803. | 97 | ✓ |
| 45012 | 9538    | 1462 WOODDEI | MS | May-05-95 | Glass, Sign, B&I | 3,815. | 97 |   |
| 18309 | 9538    | JACKSON   | MS | May-05-95 | Wind, Hail | 0. | 97 |   |
| 17917 | 9538    | JACKSON   | MS | May-05-95 | Wind, Hail | 1,467. | 97 |   |
| 46031 | 9538    | SCOTLAND  | TX | May-05-95 | Glass, Sign, B&I | 2,171. | 97 |   |
| 46030 | 9538    | SCOTLAND  | TX | May-05-95 | Glass, Sign, B&I | 2,155. | 97 |   |
| 17872 | 9538    | WHITESBORO | TX | May-05-95 | Wind, Hail | 2,884. | 97 |   |
| 17407 | 9538    | WHITESBORO | TX | May-05-95 | Wind, Hail | 641. | 97 |   |
| 45103 | 9538    | 1001 SPRINGDA | TX | May-05-95 | Glass, Sign, B&I | 1,749. | 97 |   |
| 44898 | 9538    | 1004 TERRY W | TX | May-05-95 | Glass, Sign, B&I | 2,585. | 97 |   |

MEMO: HAIL DAMAGE TO ROOF

Make Table    Back to Summary

Click blue header to re-sort    17452 claims

FIG. 17

AUTOMATED METHOD FOR IDENTIFICATION OF REINSURANCE CLAIMS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

When a catastrophe occurs insurance companies face a potentially excessive number of property claims. Although the term catastrophe is defined by Property Claim Services, PCS, as being a single occurrence that generates insured losses exceeding $25 million, insurance companies often use the term to describe any event producing extensive damage resulting in a large number of claims. While most catastrophes are weather-related, involving hurricanes, winter storms, and tornadoes, severe damage may also be caused by earthquakes and brush fires. When a catastrophe occurs often too many claims are made in a short period of time creating a number of serious problems related to an insurance company's surplus which is a company's net worth after subtracting liabilities from assets. The most devastating result would be insolvency. If the surplus is depleted too far, then the insurance company will be unable to fulfill its obligations to its policyholders. Because of the wide impact of insolvency, government regulation of the insurance industry is strict and each company is required to maintain a minimum surplus. A further problem for insurance companies is the rating system. Competition in the insurance industry has become fierce making published ratings more critical. The size of a company's surplus is a key factor analysts use to determine a company's rating. Therefore, a company which hopes to compete in the insurance market must take appropriate steps to ensure that its surplus is maintained. To maintain its surplus and protect against insolvency insurance companies may purchase one or more reinsurance policies.

An insurance company, also known as a primary or ceding company, buys reinsurance from a reinsurance company in much the same way that direct or primary insurance is purchased. When an insurance company purchases reinsurance it spreads a portion of the risk it has assumed to the reinsurance company. There are many different forms of reinsurance several of which may provide coverage when a catastrophe occurs. One such type that provides catastrophe protection is a quota share policy. Under this policy, a fixed proportion of all risks accepted by the primary insurer are ceded to the reinsurer. Another type of catastrophe protection is provided by excess of loss reinsurance. This form of reinsurance has expanded greatly in recent years to address the need for catastrophe protection. The excess of loss form of reinsurance includes two types, risk basis and occurrence basis. Under the risk basis type, the reinsurer pays any loss on an individual risk in excess of a predetermined amount. The other type of excess of loss, occurrence basis, is the only type of reinsurance specifically designed to provide catastrophe relief. When an insurance company purchases this type of reinsurance, the reinsurer pays when the aggregate loss from any one occurrence exceeds a predetermined retention or priority. See Generally.

(1) *Reinsurance*, by Carter, Merchantile & General Reinsurance Company Limited, pp. 3–12, and 59–71 (1979).

(2) *Reinsurance: Fundamentals and Current Issues*, by Gastel, et al., Insurance Information Institute, pp. 10–21 (1983).

(3) *Underwriting Decisions under Uncertainty*, Ayling, Gower Publishing Company, pp. 3–14 (1984).

(4) *Operations of Life and Health Insurance Companies*, by Higgins, LOMA (Life Office Management Association, Inc.), pp. 210–216 (1986).

Once an insurance company has purchased various types of reinsurance, its problems are not completely solved. For reinsurance to serve its purpose an insurance company must be able to collect payments due from the reinsurance company. While this may appear a simple matter, to collect the payments the insurance company must submit to the reinsurer a list of all claims relating to a given catastrophe. This list is known as a claims bordero. To create this list insurance companies first store in a computer system the information collected by insurance agents and claim adjusters for all claims made. Normally, when claims are submitted, the agent should include a catastrophe code, or CAT code, if appropriate, which indicates that the damage was caused by a particular event. The PCS assigns code numbers to catastrophes causing greater than $25 million in insured losses, and companies will often use these numbers. While this helps to standardize communications among insurance companies and reinsurers, use of these numbers is not required and an insurance company may assign its own code numbers. After storing the claims information, including CAT codes, insurance companies use complex software programs to sort through the data and compile a list of all the claims with a particular CAT code. The computer then determines, based on the types of reinsurance purchased, which claims or amounts should be submitted to the reinsurance company.

A claim is only included in the list if it has been flagged for the computer with a CAT code. Codes may be omitted for a number of reasons. Given the circumstances following a disaster, codes may be omitted by accident. Storms result in confusion and panic with large numbers of claims being processed in haste. A code might also be omitted because of a data entry error. Further, payments are often made before the true extent of the damage is realized. Even if the original claim was properly flagged, payments made at a later date may not be. Damage may not be discovered for a long time, as with water and roof damage and damage to second homes. Such claims when made may not be properly identified with a CAT code. In addition, mobile property such as motor homes, automobiles and heavy equipment may suffer catastrophe damage thousands of miles away from the insured home location. The home agent who handles the claim may not be aware that a catastrophe occurred. For each claim that is missed, the insurance company is unable to collect the payment which it is owed by the reinsurer. While the system described above is efficient at identifying claims which are labeled with CAT codes, a method is needed to identify those claims which have not been appropriately labeled.

An approach to representing knowledge has emerged in the last thirty years which has become a rapidly developing technology. Known as fuzzy logic, this tool for knowledge modeling is used to handle the uncertainty in the world around us. This uncertainty, or fuzziness, is inadequately addressed in traditional Boolean logic and original (0 or 1) set theory. Fuzzy logic systems are described, for example, in the following publications:

(1) *Fuzzy Logic: A Practical Approach*, by McNeill, et al., AP Professional, 1994.

(2) *The Fuzzy Systems Handbook*, by Cox, AP Professional, 1994.

Any logic system consists of variables, sets and rules. Existing systems, based on original set theory, which is the basis for binary code, evaluate truth based on its existence or non-existence. Membership in a set is determined by asking whether something is a member and answering yes or no. This type of thinking, also known as crisp logic, is flawed in that truth often lies between existence and non-existence. To describe these situations which are somewhere in the middle, or fuzzy, fuzzy logic uses linguistic variables. Fuzzy sets can then be created which are associated with a linguistic variable. Each member of the set is assigned a degree of membership or degree of belonging in the set, the degree usually being represented by a percentage. Crisp logic is incorporated into fuzzy logic at the extremities. Members of a fuzzy set with a degree of membership of 0 and 100% correspond to crisp logic values 0 and 1.

Linguistic variables and fuzzy sets are then used to create fuzzy rules which are the basis of a fuzzy system. An advantage of fuzzy logic is that once translated from crisp data to linguistic variables and fuzzy sets, information may be manipulated by the well-established principles of mathematics. At the end of the process, the information is again translated and outputted as crisp data. These fuzzy systems are capable of simply describing complex, non-linear systems.

Fuzzy logic has been used in conjunction with neural networks combining the former's ability to deal with uncertainty with the latter's ability to classify and to pattern match. Modeled after the functioning of neurons in the human brain, a neural network consists of a system of nodes and weighted links. Signals to a given node are strengthened if they lead to a correct result and weakened if they lead to an incorrect result which "teaches" the network a pattern which may be used to process new data. Neural networks are not based on rules and logic structures. Fuzzy systems have been used as control systems for neural networks while neural networks have been used to produce fuzzy rules.

Insurance companies lose quite large sums of money each year because their existing computer systems are unable to identify every claim that is subject to reinsurance coverage. A system incorporating the emerging logic systems which could practically identify otherwise lost reinsurance claims from the millions of candidate claims encountered by insurance companies would be most beneficial to the industry.

BRIEF SUMMARY OF THE INVENTION

The present invention is directed to a method for producing a tabulation of catastrophic incident related claims from a great multitude of insurance claims. With the produced tabulation, insuring organizations have the capability for recovering substantial funds from reinsurance organizations, such funds otherwise being lost because of report vagaries.

To produce this claims compilation, the technique of the invention investigates available catastrophic event reports which, principally, will be continental storm event reports. In one aspect of the invention, the storm events are manually assembled in terms of location and date into storm clusters. With a preferred automatic arrangement, the storm events are clustered under an initial vigilance criteria with respect to territorial and time domains. Once an initial clustering of events to node data is carried out utilizing fuzzy logic and neural network techniques, a second clustering at lower vigilance values is carried out. In effect, a "clustering of storm clusters" is developed which is utilized in database form under the label "CatNodes database".

The method treats the raw insurance claims, which typically are provided as a raw claims database, both for the purpose of standardization and to insert geographic coordinate data. In the latter regard, supporting databases are assembled and used for inserting position data. For example, a "City2Lat" database is assembled which relates the names of cities and their states to geographical coordinates. Additionally used is a "Zip2Lat" database which relates the zip codes of a given continent to geographical coordinates. Thirdly, a "Tel2Lat" database is assembled which relates components of telephone numbers, i.e. area code and the first three digits of the telephone number to geographical coordinates. In the course of processing the raw claims data to standard format, initially the cities in the claim reports are scanned and geographic coordinates are filled in where a match with city and state is made. Where the city is not available, then the zip code database is scanned for a match and where a match is made, the geographic coordinates are inserted. Where coordinate gaps still exist, then the telephone database is scanned in an attempt to fill in the coordinates. In the event that any given record still lacks geographic coordinate information, then resort again is made to the City2Lat database to find a state match and in the event a state match is found, then to insert a state designated geographic coordinate, for example the average of the coordinate values for the cities within that state. The standardization preprocessing procedure also utilizes a loss-type database for the purpose of standardization to a certain listing of lost categories or types. A resultant standardized claims database is referred to as a "ClaimsFile".

In addition to employing the ClaimsFile database and the CatNode database, the process for matching claims reports with the entries of the CatNodes database also employs a keywords database which looks for matches of keywords with any memoranda that may be incorporated within a given claims report. Additionally, a "Type2Dob" or type of loss to degree of belonging database is employed.

Production of the noted tabulation of catastrophic incident related claims compilation is carried out utilizing fuzzy logic wherein a best degree of belonging is developed with respect to each claim report and each CatNodes database cluster or cluster node. The type degree of belonging is used as an upper limit and the keywords database is used to remove that limit in the event of a keyword match. The produced tabulation or compilation is referred to as a "ClaimsFile".

In another aspect of the invention, an arrangement is made such that a user may select a particular storm or catastrophic event identification and a threshold of degree of belonging to create any of a variety of claims report compilations. These reports are referred to as "hits database for "Target-CatId".

The invention, accordingly, comprises the method and system possessing the steps and combinations which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIGS. 11A–11F combine as labeled thereon describing the clustering of storms to related nodes to devise a Cat-Nodes database;

FIGS. 14A and 14B are flow charts combined as labeled thereon to describe the derivation of a best matching Cat-Node for every claim according to the invention;

FIG. 17 is a representation of a screen employed by an expert for manual intervention in the method of the invention.

DETAILED DESCRIPTION OF THE INVENTION

The method of the present invention produces a report for an insurance entity which will identify those insurance claims of a database of historical insurance claims supplied by the insurance entity which are related to a particular catastrophe or cluster of related disaster incidents for which reinsurance is applicable. The system uses a combination of neural networks and fuzzy logic to assign a degree of belonging (DOB) to every claim. This degree of belonging is a measure that quantifies how likely a given claim was caused by a specific disaster incident or catastrophe. The DOB is represented as a percentage varying from 0% to 100%. For the most part, the method is concerned with weather or storms. However, the approach also may look to such disaster incidents or catastrophes as earthquakes or, for example, major brush fires or the like. For clarity, the system will be described in conjunction with weather or storm based losses. The system will be seen to contain a catastrophe nodes database (CatNodes), a degree of belonging with respect to type of incident (Typ 2 DOB) database, and a keywords database which are employed in the production of a "CLAIMSFILE" wherein every claim initially submitted as raw claim data will be associated with an identified catastrophe or disaster incident in conjunction with degrees of belonging associated with the date of occurrence of an incident, the place of occurrence, the type of loss, and an overall value of DOB. Inasmuch as most of the insurance claim reports will have some short commentary or "memo", the system also employs keyword which, when found, will alter the value of the DOB, for example by adjusting it upward.

Figure 1:
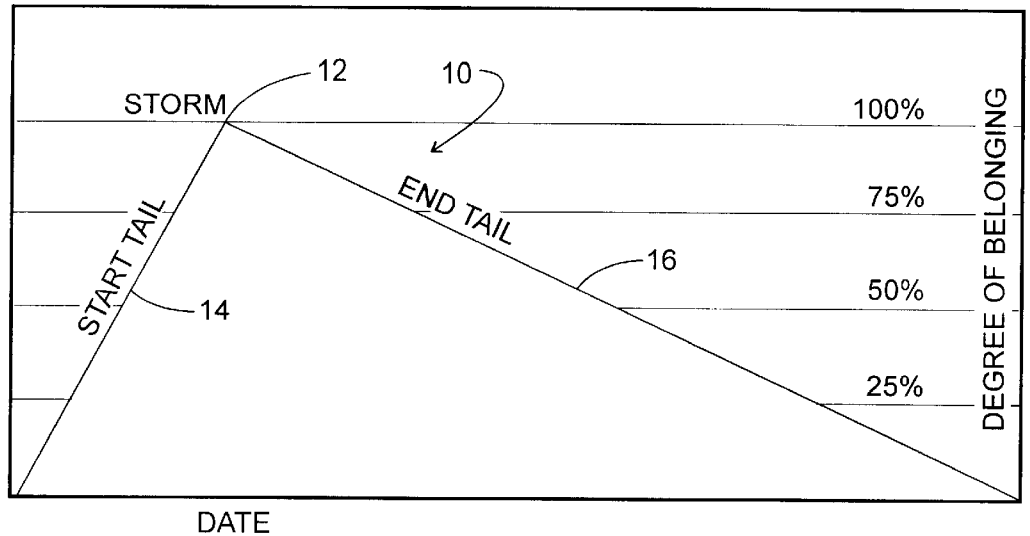
FIG. 1 is a graph schematically illustrating a fuzzy set for loss dates.

Considering the date of occurrence parameter utilized in the system or "date of loss", the date of each storm cluster is stored in the CatNodes database. Looking to FIG. 1, a fuzzy set for date of loss is graphically illustrated as the triangular curve 10. If the claim record date of loss is equal to the date of a given node or cluster, occurring at the pinnacle 12 of the curve 10, then the date DOB is, as shown, 100%. A start tail as represented at 14 may be set, for example, as at 15 days, functions to run the date DOB linearly upward from 0% to 100%. Similarly, an end tail as at 16 may encompass, for example, 60 days and is used to run the DOB value linearly downwardly from 100% to 0%. When a claim date of loss is compared against the node data 12, a date degree of belonging can be assigned.

Figure 2:
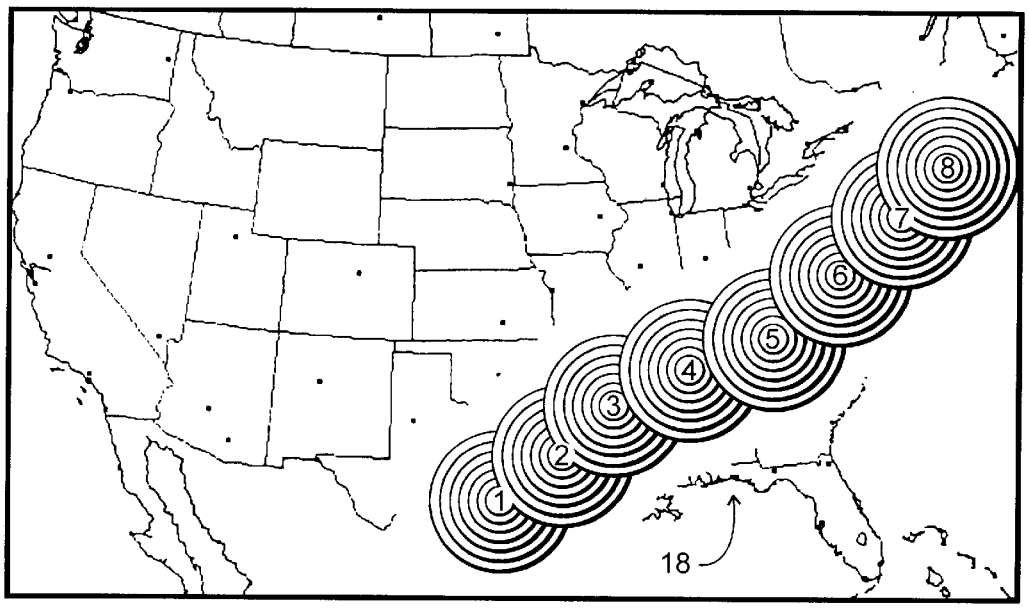
FIG. 2 is a map of the United States showing illustrative cones representing clusters of storms.

The locations for each catastrophe or disaster incident (the storm track) is stored in the CatNodes database. The location which is stored may be considered for illustrative purposes as the center point of a cluster of reported storm activities or nodes. Each node location is stored as coordinates, preferably a latitude and longitude. Two approaches may be utilized to generate the data presenting location. For example, the geographic locations may be reduced to fuzzy sets by using an array of cones, each cone having variable size, shape, and eccentricity. Looking momentarily to FIG. 2, a an arrangement of eight such cones is depicted generally at 18, extending across the eastern portion of the United States. In establishing these location clusters of storms, a distance limit for each is established, for example, 1320 miles, representing, for convenience, one-third of the radius of the earth. In general, the place DOB or location oriented degree of belonging ramps linearly downwardly from the cone pinnacles until it reaches 0% at the noted 1320 mile distance or domain from the node center. Thus, when claim report location is compared against such a node location, a location degree of belonging may be generated. A preferred generation of the location data is described herein wherein a software-based approach is undertaken. The location clusters also may be developed manually from, for example, government generated storm report data.

Considering the type of loss, in a preferred embodiment, the method considers 10 types of loss identified as follows:

1. wind, hail
2. water
3. fire, explosion
4. earthquake
5. collapse
6. riot, vandalism, malicious mischief, burglary, theft, robbery
7. glass, sign, boiler, machinery
8. other catastrophe
9. unknown
10. liability—non-applicable.

For each application of the system, the incident type parameter or type of loss is assigned a degree of belonging (DOB) and in a preferred arrangement, this type DOB is applied as a maximum limit to an overall valuation of degree of belonging.

Figure 3:
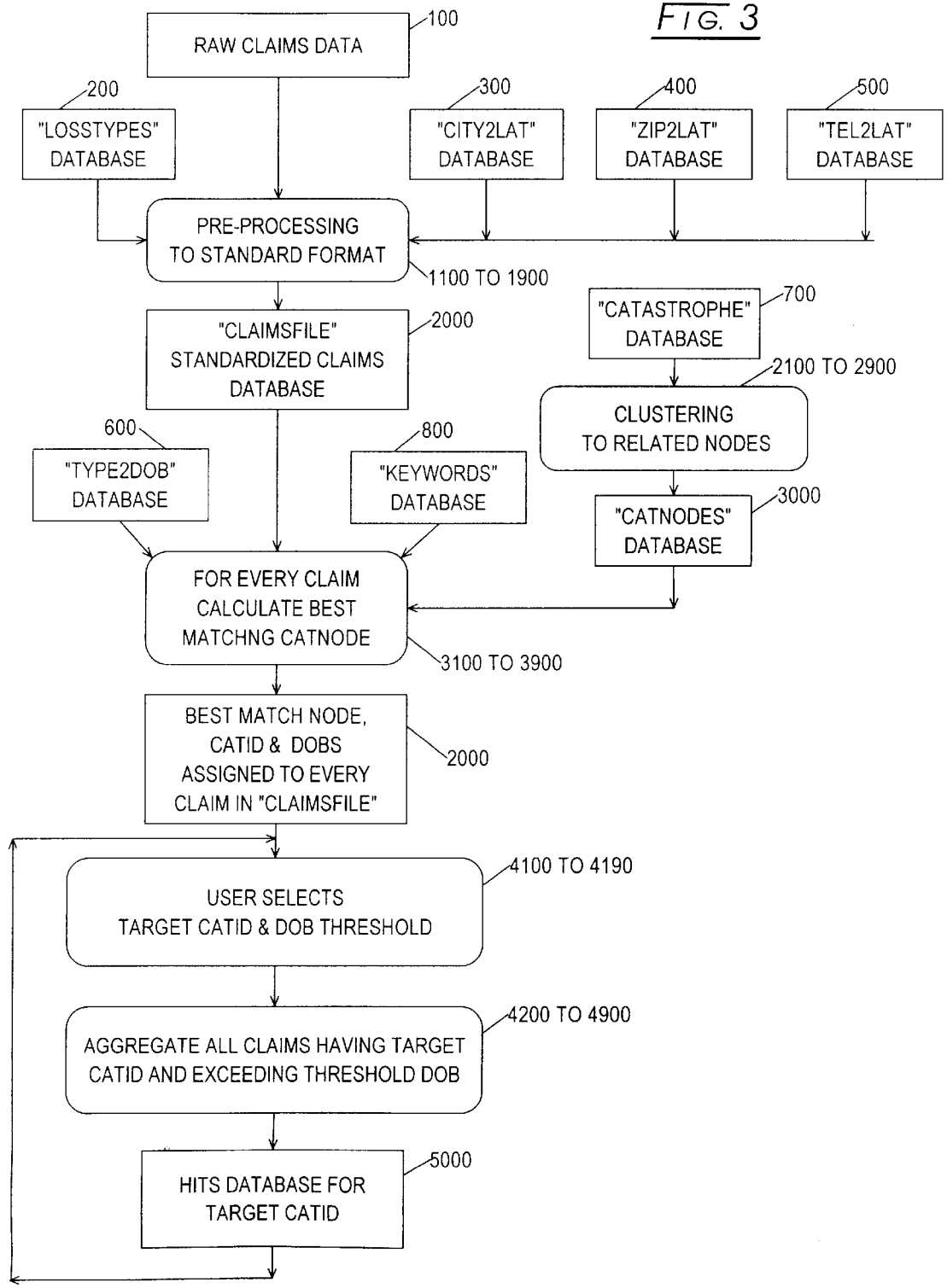
FIG. 3 is a flow chart illustrating the overall process and system of the invention.

Referring to FIG. 3, a block diagrammatic representation of the overall system and method of the invention is provided. In general, the system performs in a tabular fashion of columns or fields and rows representing insurance claims or reports. Typically, the method will be used with from about 200,000 to 3,500,000 of such reports. Storm data, generally, is produced from about 20,000 storm reports. Looking to the figure, block 100 shows the introduction of raw claims data which typically is produced from a mainframe computer of an insurance company. This data will be provided with generally 30 to 50 fields of data. Those fields might identify, for example, claim number, accident year, company name, profit area, policy number, annual statement line, policy type, work line coverage, policy state, risk state, accident city, accident county, accident state, policy start date, policy end date, claim number, date of loss, date of report, status as being open or closed, a catastrophe code number, type of loss, cause of loss, claimant number, accident code, amount paid to date, amount outstanding, amount allocated, expenses, recoveries to date, and the like. These fields generally will be seen to be varied from one insurance company to another. Thus, the system is called upon to alter this raw data into a standardized claims database referred to as "CLAIMSFILE". Standardized Claims Database and shown at block 2000. This standardized insurance claims database of insurance claim reports will have a predetermined loss-type datum, an earth location datum, and a date datum Additionally, the noted memo information will remain available. The procedure for preprocessing the raw claims data 100 to standard format is represented at block 1100 to 1900. That preprocessing procedure involves the utilization of a predetermined loss type input as represented at block 200. This "LOSSTYPES" database contains, for example, the above-noted 10 loss categories. Database 200 generally is provided as a look-up table that relates the 30 to 50 raw claim data loss types to the 10 standardized loss types. The determination of geographic location is one which identifies the longitude and latitude on earth of the claim damage location. To provide this information, look-up tables with longitude and latitude are provided which are associated as represented at block 300 with a given city. This "CITY2LAT" database will contain the longitude and latitude of, for example, 150,000 cities and towns. Next, as represented at block 400, a zip code based geographic location database is provided. In this regard about 40,000 zip codes are associated with longitude and latitude data. Next, a telephone number-based geographic location database is provided. This "TEL2LAT" database will associate area code and the next three digits of a telephone number with longitude and latitude information.

Now looking to the generation of the CatNode database as depicted at block 3000, this database is developed from the reports of about 20,000 storms occurring over an interval, for example, of about five years. That storm data is represented at block 700 and is identified as a "catastrophe" database. As represented at block 2100 to 2900, the database 3000 is developed by clustering the storms disaster incidents which are related with respect to their date of occurrence parameters, an earth location parameter. The number of reports that represent one cluster will vary substantially. For example, one to three reports may represent a tornado while 200 to 400 reports may be clustered in conjunction with a hurricane. The purpose of this clustering is to amalgamate the data into larger, manageable clumps of nodes with which individual insurance claims may be identified.

Block 600 represents the preestablished loss type data as described at block 200 but now associated with a degree of belonging value. For example, if the system is directed to provide information concerning a tornado-type disaster incident or catastrophe, then the type 1 described above as representing wind and hail will have a 100% degree of belonging. Correspondingly, a degree of belonging for liabilities will be 0%.

Block 800 represents the keywords database which is provided as a tabulation of certain keywords which will have significance with a given form of disaster incident or catastrophe. These keywords are employed in conjunction with the memo component of any given insurance claim. The data represented at blocks 600, 800, and 3000 as used in processing of the standardized claims database will result in production of the smaller ClaimsFile database is represented at block 2000. In this regard, as represented at block 3100 to 3900, for every claim of the standardized claims database, the entire CATNODES database 3000 is scanned to determine which one of the storms or catastrophes is most closely related to that given claim. When such an association is determined, the data is saved in the "CLAIMSFILE" as represented at block 2000. As noted in that block, the best match for each node of the database 3000 is made and the identification of a storm or disaster incident identified as "CATID" is provided in conjunction with an associated sequence of degrees of belonging. Those degrees of belonging (DOBs) will include a date DOB, a place DOB, a type DOB, and an overall DOB. For the instant embodiment, the type DOB is adjusted for the presence of keywords of the memo field and the overall DOB is taken as the average of the date DOB and place DOB. Further, for the present embodiment, the overall DOB is not allowed to exceed the adjusted type DOB.

The "CLAIMSFILE is the principal product of the system and method. It can be used in a variety of ways. Generally, the insurance company user will elect how it is to be utilized. In this regard, as represented at block 4100 to 4190, the user is seen to select a target catastrophe or disaster incident identification (CATID) and also elect a degree of belonging (DOB) threshold. For a given storm, the user may wish to observe all data representing a DOB above 75% for a certain storm. As represented at block 4200 to 4900, the system then aggregates all claims having that target storm identification (CATID) and which exceeds the elected threshold DOB. The result of this procedure is to provide a "hits" database for that target storm (CATID) as seen at block 5000. The procedure then may loop such that the user may then select another target storm and degree of belonging threshold.

FIGS. 4 through 10 describe the procedure of the system wherein the raw claims data described at block 100 in FIG. 3 is preprocessed to a standard format as represented at block 1100 to 1900.

Figure 4:
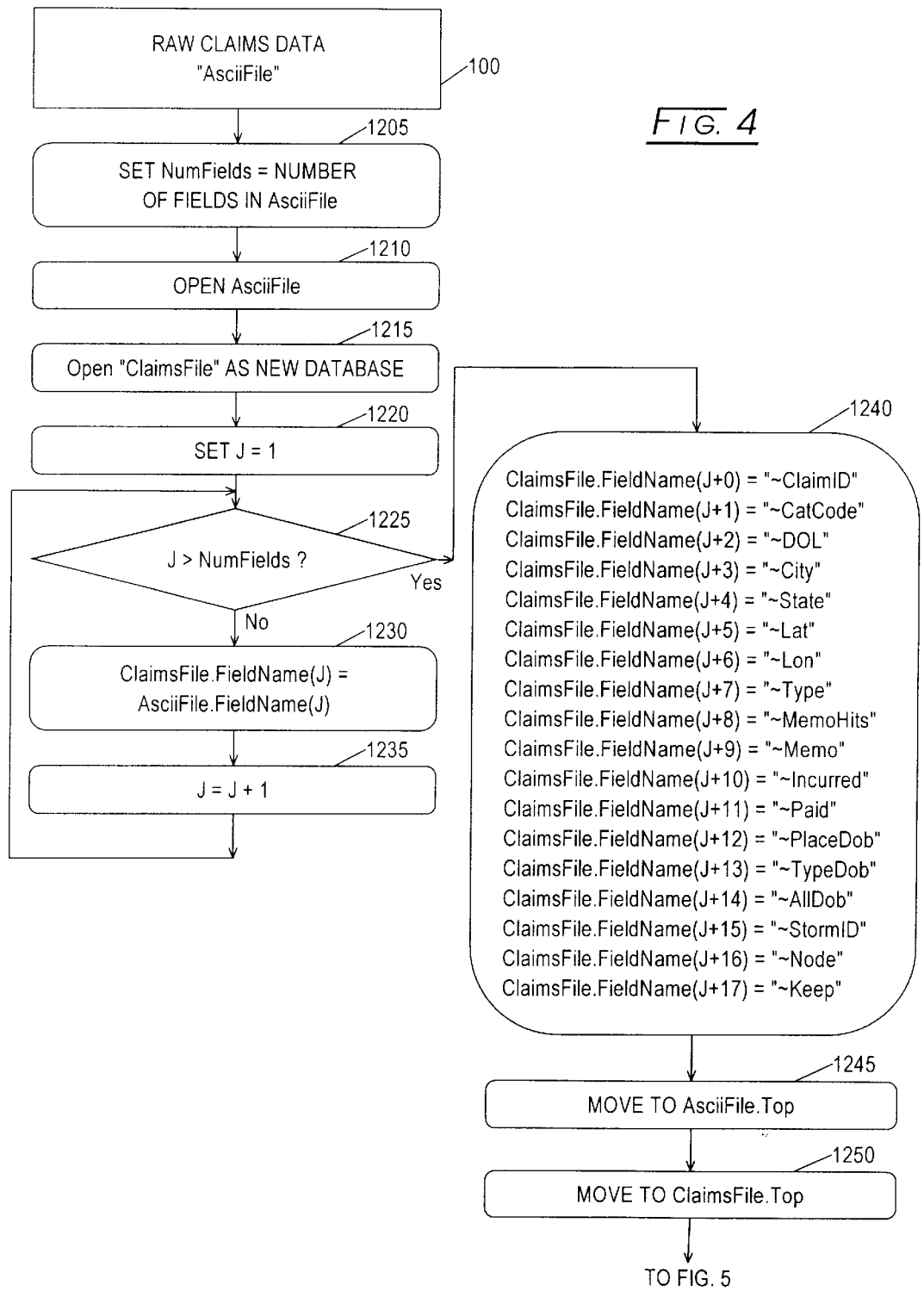
FIG. 4 is a flow chart describing the importation of field names in accordance with the procedure of the invention.

Referring to FIG. 4, the fields or column for the standardized claims database are, in effect, filled out. In this regard, block 100 reappears, identifying the insurance company data as AsciiFile. At block 1205, the number of fields in the new database is set equal to the number of fields in the incoming (Ascii File) database. Next, as represented at block 1210, the AsciiFile database is opened. Then, a ClaimsFile is opened as a "NEW DATABASE". A counter J then is set to 1 as represented at block 1220 and the process then queries as to whether the value of J is greater than the number of fields, as represented at decision block 1225. In the event of a negative determination, then as represented at block 1230, the claims file field name number (J) is set to the Ascii File field name number J. Then, as represented at block 1235, the value J is incremented and the procedure returns to the decision at block 1225 until all of the Ascii File columns or fields have been visited. When the query at block 1225 results in an affirmative response, then as represented at block 1240, additional special fields or columns are added at the right-hand side of the table structure or template. Contained within block 1240 is the identification of a variety of scratch fields used for internal purposes. These fields are identified by a diacritical mark, in this case a ~. Looking to those specialized fields, "~Claim ID" provides a claim identification for the instant process. In this regard, very often, the claim identification numbers of insurance companies are not unique. Next, the field "~Cat Code" is a catastrophe or disaster incident code. "~DOL" is a date of loss field. "~City" is a city name for identifying the city within which a loss would have occurred. "~State": identifies a state in which a loss will have occurred. "~Lat" identifies the latitude involved, while, correspondingly, "~Lon" represents the longitude at hand. "~Type" identifies the type of loss. "~MemoHits" is a field describing the number of matches made between keywords and the memo data. "~Memo" is a field representing the claim memo. "~Incurred" is a field representing all of the money which has been spent on a given claim including the insurance company's own internal expenses. It represents what has already been paid out and what remains to be paid out less any scrap value that may have been recovered. "~Paid" represents the amount paid by the insurance company for the given claim. "~Place Dob" is a field representing the degree of belonging of the loss location. "~Type Dob" is a field representing the type of loss for a given claim. "~All Dob" is a field representing the overall combination of all the other DOBs. "~StormID" is the identification given a given storm or cluster. "~Node" is a subset of the StormID field. In this regard, every StormID will typically have several nodes. The node is an individual storm report that contributes to the cluster identified by StormID. "~Keep" is a field representing a flag that is set manually by an expert once a potential hit is located. In effect, the expert indicates an agreement or lack of agreement with the software result.

At this juncture in the program, the field names have been imported and the program moves to the top of the raw claims data or Ascii File represented at block 1245 and additionally, as represented at block 1250 moves to the top of the Claims File.

Figure 5:
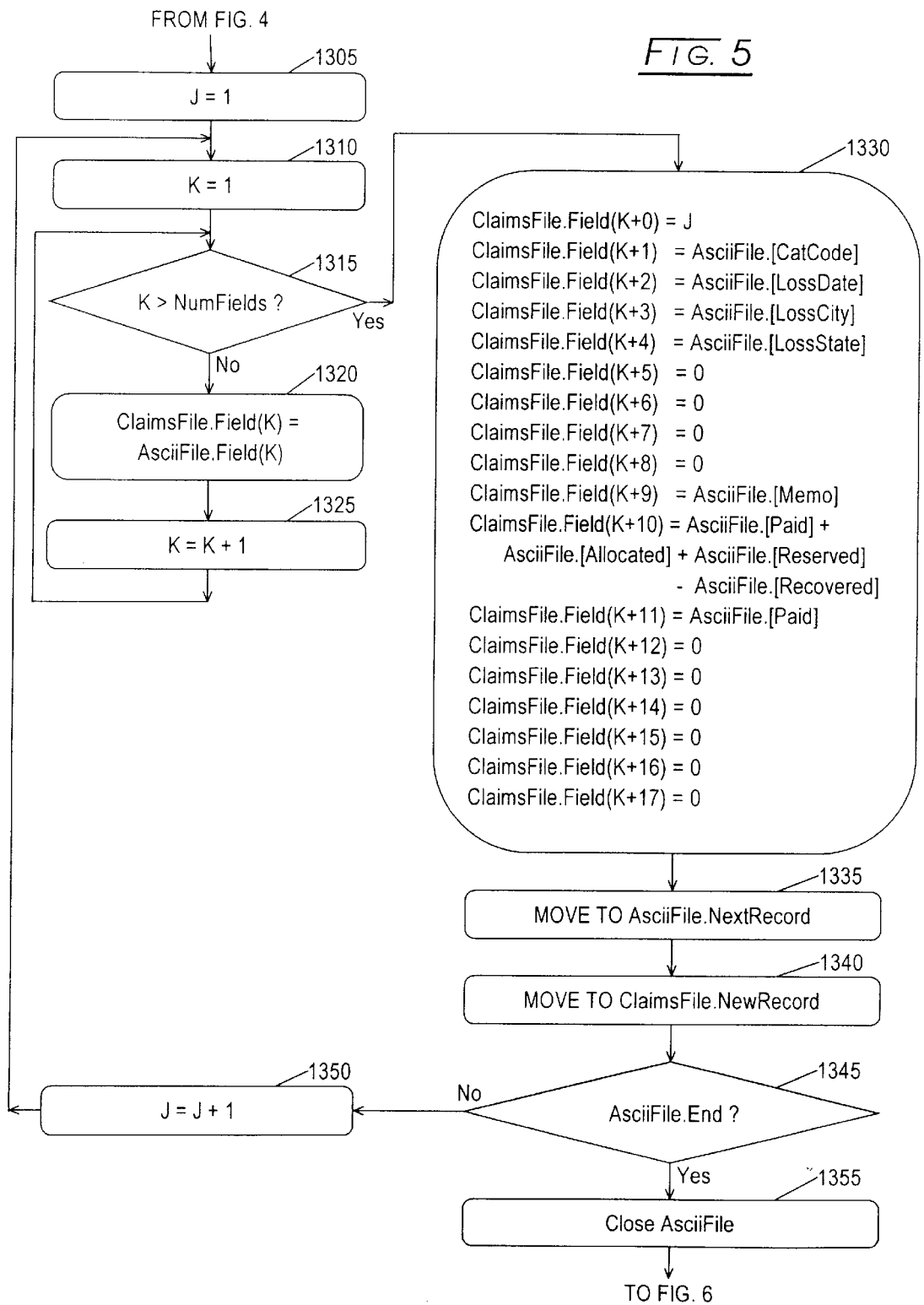
FIG. 5 is a flow chart illustrating the importation of data as part of a preprocessing procedure.

Referring to FIG. 5, the procedure continues. In this figure, the technique of importing data from the raw claims or AsciiFile raw data is demonstrated. As represented at block 1305, a record count or row counter J is set to 1 and, as represented at block 1310, a field or column counter K is set to 1. The program then proceeds to the query posed at block 1315 determining whether or not the value of K has reached the number of fields at hand. Where that is not the case, then as represented at block 1320, the number in the claims file database is set equal to the number in the AsciiFile database. Then, as represented at block 1325, the counter K is incremented by 1 and, in effect, will move over one column or field to the right and import the next number. This is represented by the loop line from block 1325 to the input to block 1315. Where the test posed at block 1315 provides an affirmative response, the program moves to block 1330 and the 18 additional columns or fields are filled out. The initial instruction at block 1330 provides for filling out the first field described in conjunction with block 1240 at FIG. 4, i.e. setting the claim ID number equal to J. This insures that a unique identifier is provided for each row of the table being assembled. It may be observed that the given ID number represents the number of rows down from the top of the file. Next, the second of these fields is set equal to the Asciifile catastrophe code and the third field is set equal to the Loss Date. Next, the fourth field is set equal to the AsciiFile Loss City and the fifth field is set equal to the Asciifile Loss State. The fields K+5–K+8 are set equal to 0 at this time. Field K+9 of the ClaimsFile then is set to the AsciiFile Memo and the field K+10 is set to the insurance company paid dollars plus their allocated dollars plus their reserve dollars plus their recover dollars. Field K+11 is set to the AcsiiFile paid dollars and the remaining fields are set to 0 for the present time. Then, as represented at block 1335, the program moves to the next AsciiFile next record or row. Correspondingly, as represented at block 1340, the program moves to the next ClaimsFile new record or next row. Then, as represented at block 1345, the program queries as to whether the end of the raw data or AsciiFile has ended. With a negative determination, then as represented at block 1350, the counter J is incremented by 1 and the next row or record is filled out. When an affirmative determination is made with respect to the query posed at block 1345, then as represented at block 1355, the AsciiFile is closed, the data from that raw data file will have been imported into the ClaimsFile.

The imported data now is positioned for normalization or processing to standard format.

Figure 6:
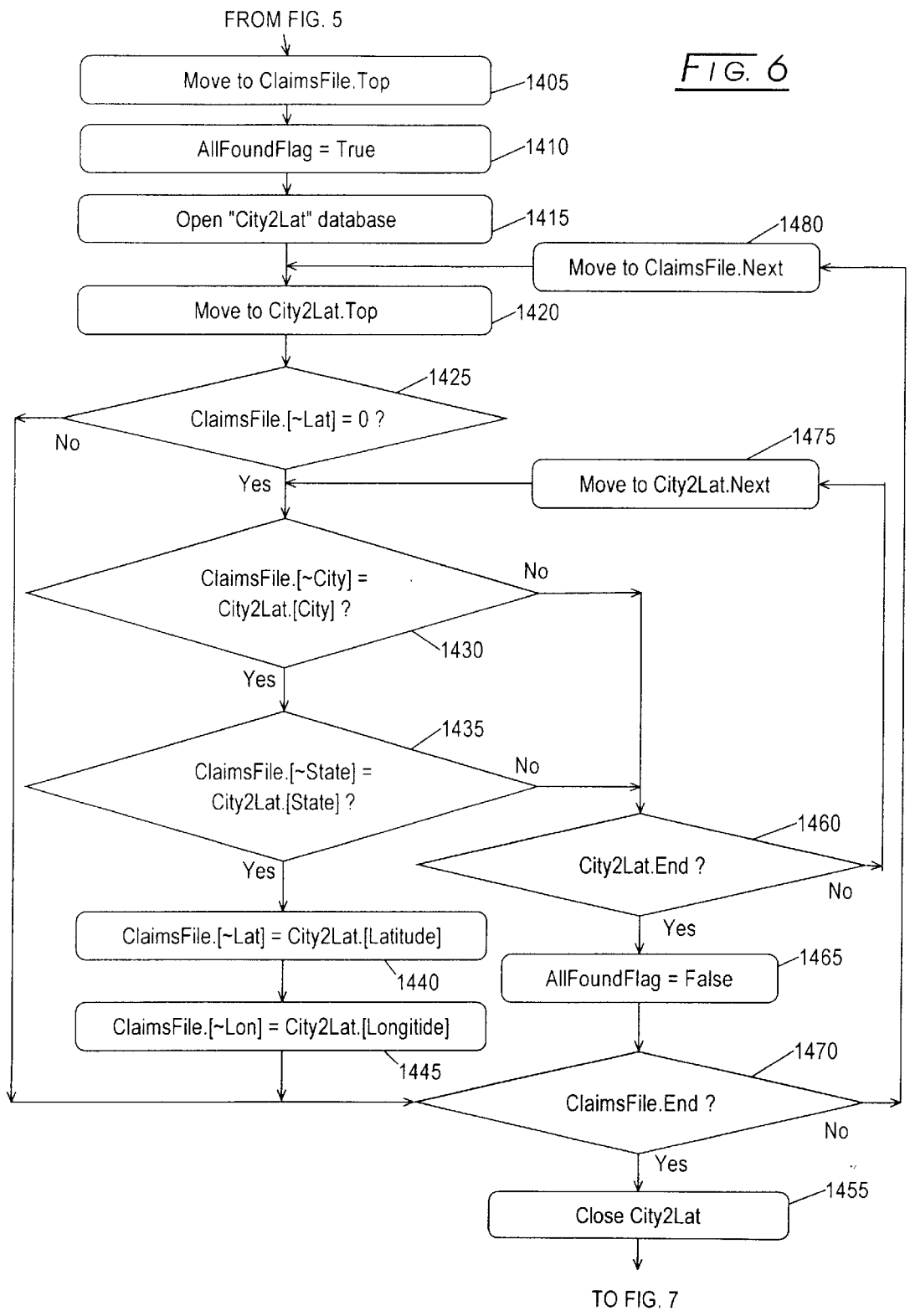
FIG. 6 is a flow chart describing the determination of latitude and longitude based upon city.

Referring to FIG. 6, the procedure which is preferred for obtaining location data is illustrated in flow chart fashion. The preferred approach for determining position data is to utilize the city name wherein the loss may have occurred. This procedure commences with the instructions at block 1405 wherein the program moves to the top of the ClaimsFile. Next, as represented at block 1410, a flag, identified as "AllFoundFlag" is set to true. This flag is utilized to indicate whether the program has completed all of the cities or whether the claims report database contains the names of cities not known to the program. Next, as represented at block 1415, the City2Lat database is opened. It may be recalled that this database, as described at block 300 in FIG. 3, inter alia, contains a record of about 150,000 cities and towns with their associated state, county, and latitudes and longitudes. Then, as represented at block 1420, the program moves to the top of the City2Lat reporting database. The program now will cycle one row at a time through all of the cities and towns until a match is found. Accordingly, at block 1425, a query is made as to whether the latitude of the current claim record is still equal to 0. If that is the case, then the city or town has not been located at the present time. The protocol employed with the query at block 1425 utilizes brackets and a dot. The dot is the object dot property and the brackets indicate a property being a field. The word within the brackets is the name of the field. It may further be recalled that the scratch field at hand is set to 0 at block 1330 in conjunction with FIG. 5. The program then proceeds to the query posed at block 1430 determining whether the ClaimsFile identified city is equal to the presently-identified city within the City2Lat database. An affirmative determination to this query means that the city has been matched and the program continues to the query posed at block 1435. This query determines whether the ClaimsFile identified state is equal to the City2Lat state. An affirmative determination to the query posed at block 1435 confirms that the correct city has been identified and, as represented at block 1440, the latitude field is filled in with the latitude value obtained from the City2Lat file. Next, as represented at block 1445, the longitude value for the city is acquired and entered into the claims file. The program then is directed to the query posed at block 1470 wherein a determination is made as to whether the entire ClaimsFile has been scanned. In the event that it has, then as represented at block 1455, the City2Lat file is closed. Where a negative determination is made with respect to the query posed at block 1470, then as represented at block 1480, the next row or claim is addressed and the program continues.

Returning to blocks 1430 and 1435, where a negative determination is evoked with respect to either of the queries posed, then the program is directed to the query posed at block 1460 wherein a determination is made as to whether the end of the City2Lat file has been reached. This would indicate that the entire listing of that file has been accessed for the present probe. Where a negative determination is made with respect to the query posed at block 1460, then as represented at block 1475, the program moves to the next City2Lat row and continues as represented by the query at block 1430. Where a determination is made that the City2Lat file has been completely reviewed, then as represented at block 1465, the above-noted AllFoundFlag is set to false indicating that a blank exists with respect to the identification of latitude and longitude. As represented at block 1470, the program continues without filling out that row location. Finally, it may be observed that in the presence of a negative determination with respect to the query posed at block 1425, the program reverts again to the query posed at block 1470. In general, the procedure carried out in connection with FIG. 6 is somewhat automated with the utilization of conventional database management procedures.

Figure 7:
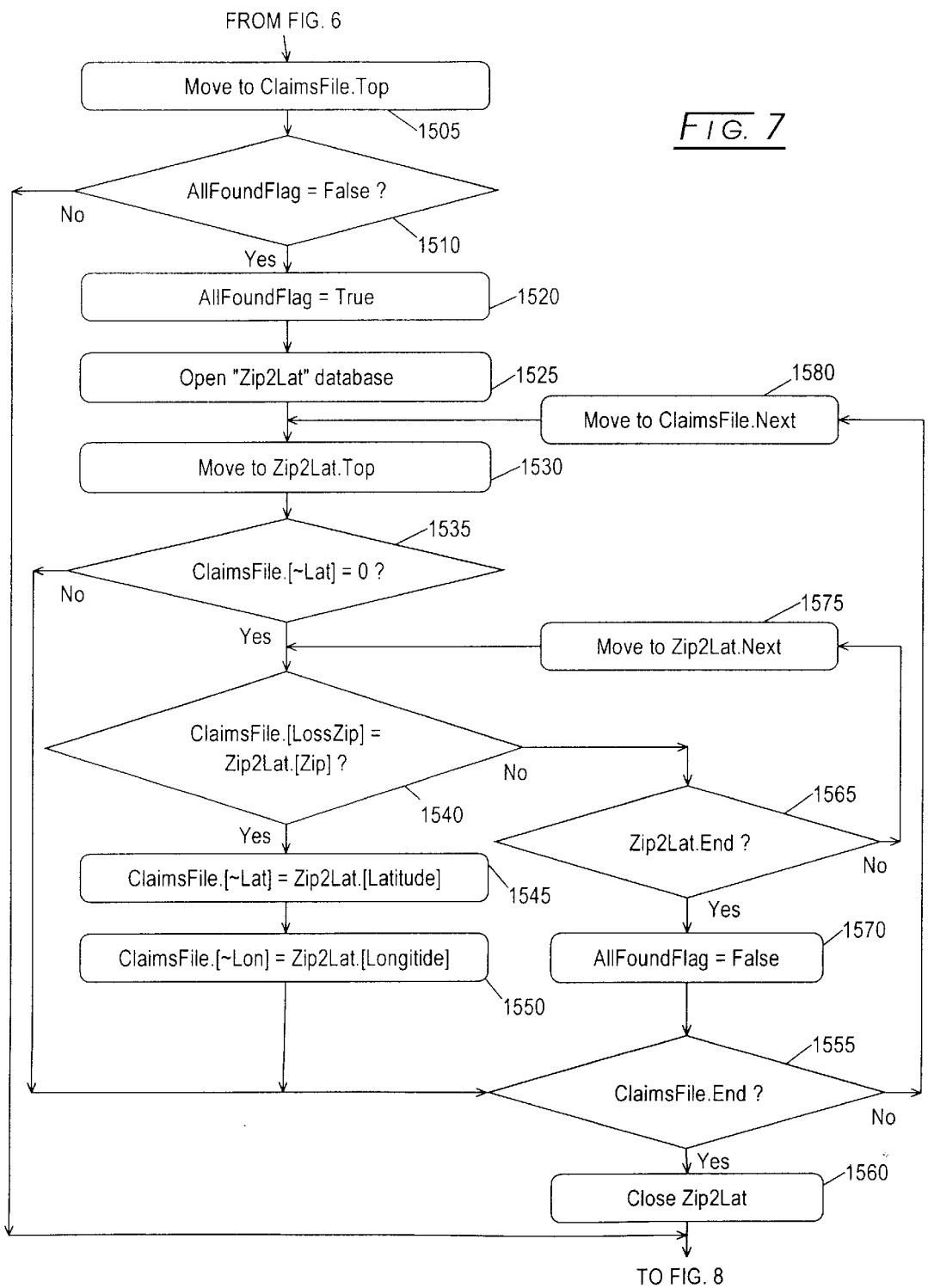
FIG. 7 is a flow chart illustrating the determination of latitude and longitude based upon zip code.
Figure 8:
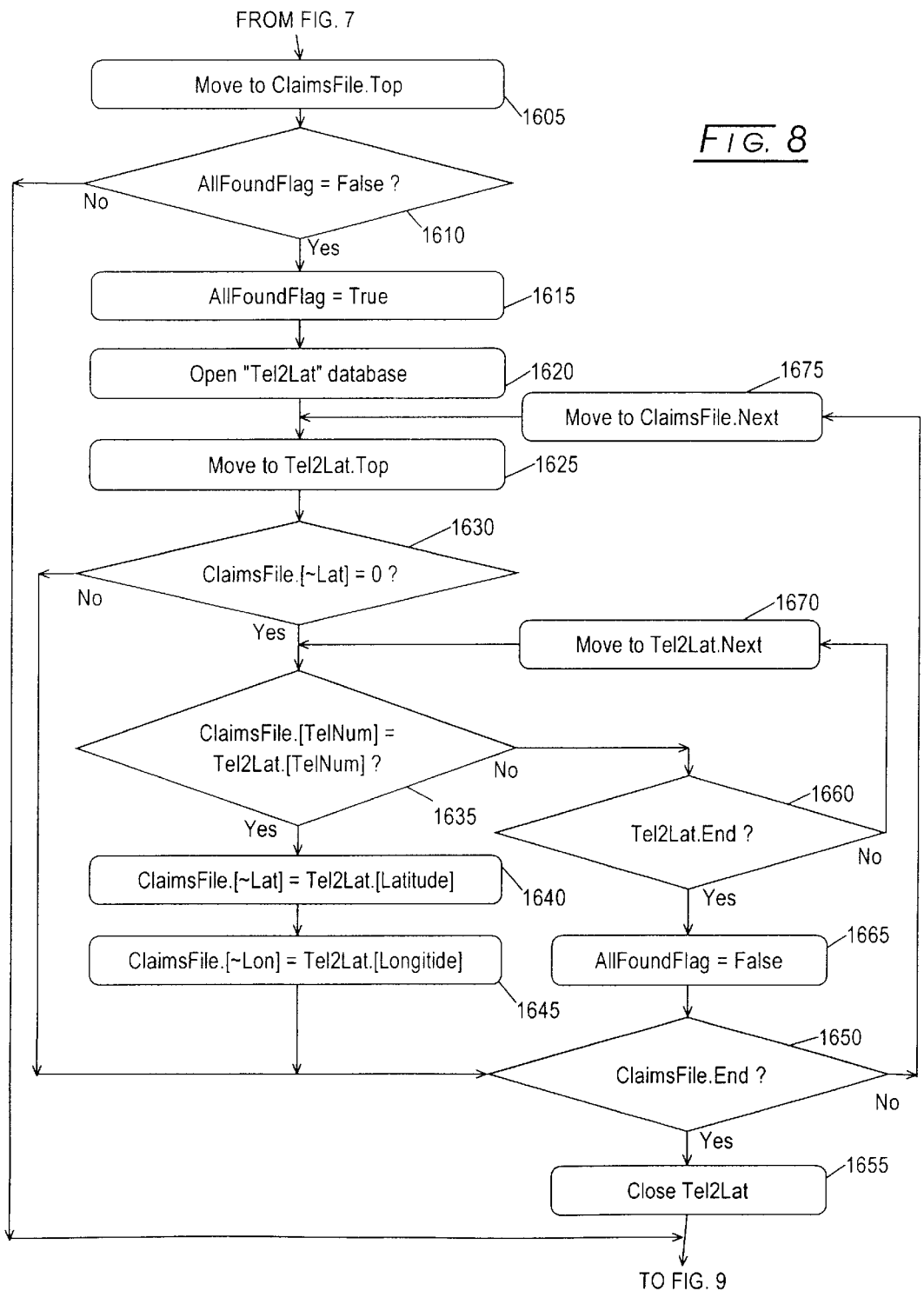
FIG. 8 is a flow chart describing the determination of latitude and longitude based upon telephone numbers.

The program then proceeds to attempt to determine location based upon zip codes in the event that the AllFoundFlag was set to false as discussed in connection with block 1465 in FIG. 6. This procedure utilizes the Zip2Lat database described at block 400 in connection with FIG. 3. Looking to Fig, 7, as represented at block 1505, the program moves to the top of the ClaimsFile and proceeds to determine whether or not the AllFoundFlag is set to false. In the event this flag is not false, then the procedure of FIG. 7 is skipped as being unnecessary. However, where the AllFoundFlag is set to false, then the program resets that flag to true as represented at block 1520. Then, as represented at block 1525, the Zip2Lat database is opened and the program moves to the top of that database as represented at block 1530. If a zip code was provided with the AsciiFile, then a LossZip file would have been established in ClaimsFile in conjunction with the introduction at block 1320 (FIG. 6). As represented at block 1535, a query is made as to whether the ClaimsFile latitude field for the row at hand is 0, i.e. contains no entries. In the event that it is at a 0 value, then the initial row of the Zip2Lat database as described in conjunction with block 400 in FIG. 3 is compared. In the event of a match, then as represented at block 1545, the latitude corresponding with that zip code is recorded and as represented at block 1550, the longitude value from the Zip2Lat database is recorded. The program then continues to the query at block 1555 to determine whether the end of the ClaimsFile has been reached. If it has not, then the program loops to the next ClaimsFile row as represented at block 1580 and the procedure continues as represented at block 1530.

Where the query posed at block 1540 results in a negative determination and no match has been made, then as represented at block 1565, a query is made as to whether all entries or rows of the Zip2Lat database have been compared. In the event that they have not, then as represented at block 1575, the program moves to the next row of the Zip2Lat database. If the query at block 1565 results in an affirmative response, then all zip code to latitude rows of that database have been examined and the AllFoundFlag is set to false. The program then reverts to the query at block 1555 and when the ClaimsFile is ended, the Zip2Lat file is closed as represented at block 1560.

Where a latitude and longitude entry is missing following the zip code base determination of the latitude and longitude, then the program proceeds to locate the latitude and longitude data utilizing the telephone number database described in conjunction with block 500 in connection with FIG. 3. Looking to FIG. 8 this procedure is illustrated in flow diagrammatic fashion. FIG. 8 reveals that this component of the program commences with the return to the top of the ClaimsFile as represented at block 1605. Then, as represented at block 1610, a query is made as to whether the AllFoundFlag is false. If it is not, then the latitude and longitude data entry procedure has been completed and this component of the program is skipped. However, if this flag has been set to false, then as represented at block 1615, the AllFoundFlag is set to true and as represented at block 1620, the Tel2Lat database is opened. If a telephone number was provided with the AsciiFile, then a TelNum field would have been established in ClaimsFile in conjunction with the instruction at block 1320 (FIG. 6). As represented at block 1625, the program moves to the top of that telephone number-based positional database and, as represented at block 1630, a query is made as to whether the latitude field for the row at hand in the ClaimsFile is empty or 0. In the event that it is, then as represented at block 1635, a TelNum field comparison is made between the telephone number entry in the ClaimsFile with respect to the row at hand in the Tel2Lat database. Where a match has been found, then as represented at block 1640, the latitude entry in the ClaimsFile is filled out with the latitude data associated with the match telephone number available from the Tel2Lat database. Additionally, as represented at block 1645, the corresponding longitude value is entered from the Tel2Lat database into the ClaimsFile at the longitude field. The program then progresses to the query posed at block 1650 to determine whether or not the last row of the ClaimsFile has been reached. In the event that it has not, then as represented at block 1675 the next row of the ClaimsFile is examined and the program continues as represented at block 1625.

Where the query posed at block 1635 results in a negative determination, in that there was no match of telephone numbers (area code and the first three digits), then as represented at block 1660, a query is made as to whether the program has reached the bottom of the Tel2Lat database. In the event that it has not, then as represented at block 1670, the program moves to the next row of the Tel2Lat database and continues with the telephone number matching query of block 1635. Where all rows of the Tel2Lat database have been examined to provide an affirmative determination with respect to the query at block 1660, then the program sets the AllFoundFlag as false as represented at block 1665 and progresses to the query posed at block 1650. Where the ClaimsFile has been fully explored, then, as represented at block 1655, the Tel2Lat file is closed and the program continues. Note that a negative determination with respect to the query posed at block 1630 wherein the positional data has been seen to be filled in, then the program reverts, as before, to the query posed at block 1650. Thus, the program skips those rows which have earth location data.

Certain of the reports of the raw claims database supplied by an insurance company may not have city, zip code or telephone number identification but only will have state information. In this regard, in some instances, the name of the city will be misspelled and the zip code and telephone number may be missing. Under such conditions, the program utilizes the latitude and longitude data associated essentially with the center of the state as an approximation. The technique employed is one wherein the system has created a hypothetical city in every state having the name "State Average". That hypothetical city is given a longitude and latitude which is equal to the average longitude and latitude of every city in the state. Thus, the earth position of the hypothetical State Average city typically will be somewhat close to the center of the state.

Figure 9:
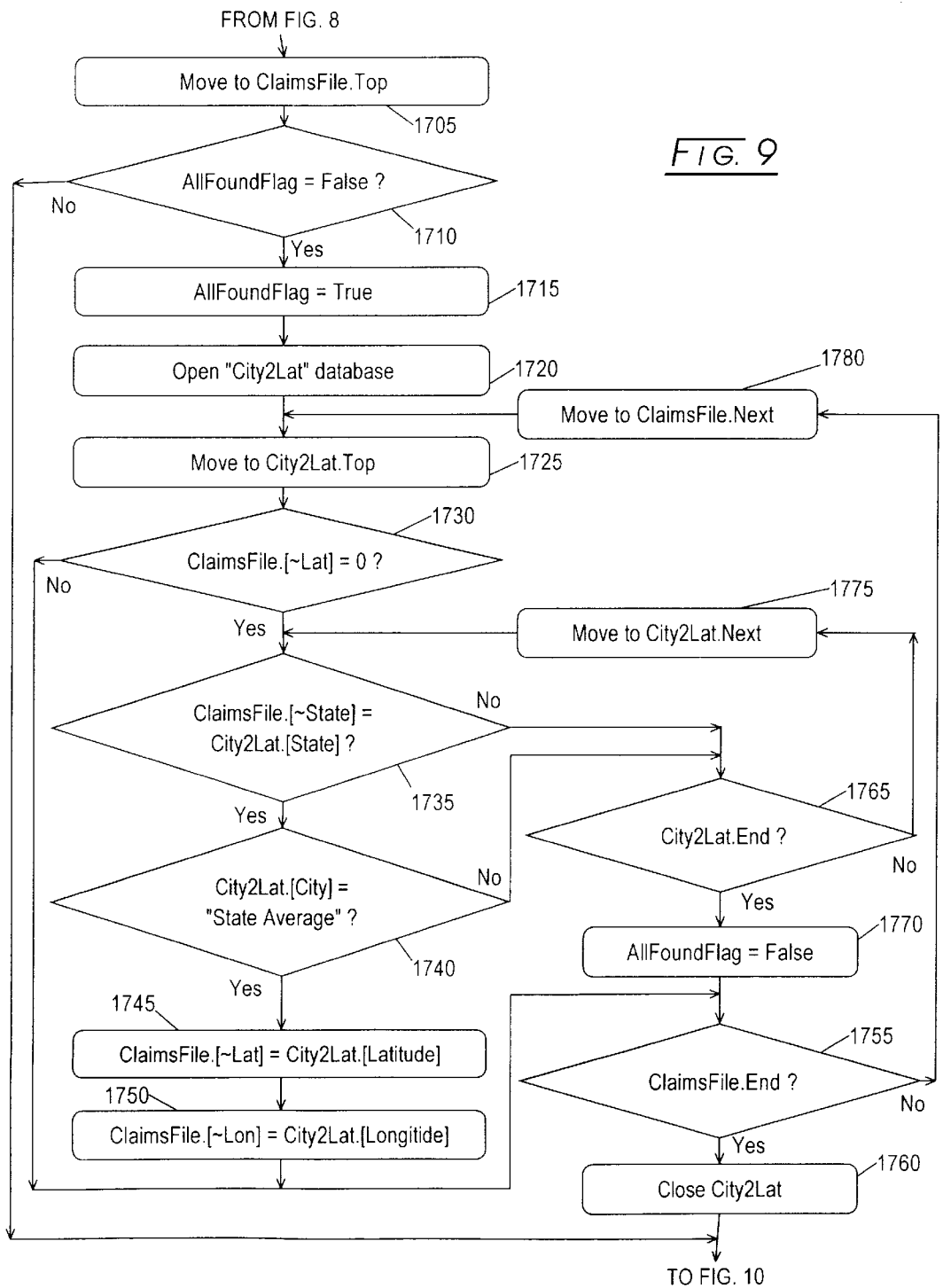
FIG. 9 is a flow chart describing the determination of approximate latitude and longitude based upon state name.

Looking to FIG. 9, this component of the procedure commences as represented at block 1705 with again moving to the top of the ClaimsFile. Next, as represented at block 1710, a query is made as to whether the AllFoundFlag is false. In the event that it is not, then this component of the program is skipped. However, where the AllFoundFlag is set to a false status, then as represented at block 1715, the AllFoundFlag is set to true and as represented at block 1720, the City2Lat database again is opened. Then, as represented at block 1725, the program moves to the top of the noted City2Lat database and proceeds to the query posed at block 1730. In this regard, an initial determination is made as to whether the ClaimsFile latitude field is blank for the row at hand. In the event that it is, then as represented at block 1735, an inquiry is made as to whether there is a match between the ClaimsFile state identification and the City2Lat state identification. In the event that a match is made, then as represented at block 1740, the program looks for the fictitious city name, State Average within the City2Lat database. Where a match is found, then as represented at block 1745, the latitude field of the ClaimsFile is filled in with the latitude data of the City2Lat file. Similarly, as represented at block 1750, the longitude field of the claims file is filled in with the longitude data from the City2Lat database. The program then proceeds to the query posed at block 1755 determining whether the end of the ClaimsFile has been reached. In the event that it has not, then as represented at block 1780, the program moves to the next row of the ClaimsFile and proceeds as represented at block 1725. In the event of a negative determination with respect to the queries posed at blocks 1735 and 1740, then the program determines whether the City2Lat database has been fully explored. In the event that it has not, then the program moves to the next row of the City2Lat database as represented at block 1775 and the query posed at blocks 1735 and 1740 again are made. If a determination is made in connection with the query at block 1765 that the program has reached the end of the City2Lat database, then, as represented at block 1770, the AllFoundFlag is set to false and the program proceeds to the query at block 1755 determining whether the program is at the end of the claims file. In the event that it is, then as represented at block 1760, the City2Lat file is closed.

Returning to block 1730, where a negative determination is made in connection with the query posed, then the earth position information has been entered into the ClaimsFile database and the program then proceeds to the query at block 1755, continuing to a next row in the ClaimsFile or closing the City2Lat file where the program has reached the end of the ClaimsFile.

Figure 10:
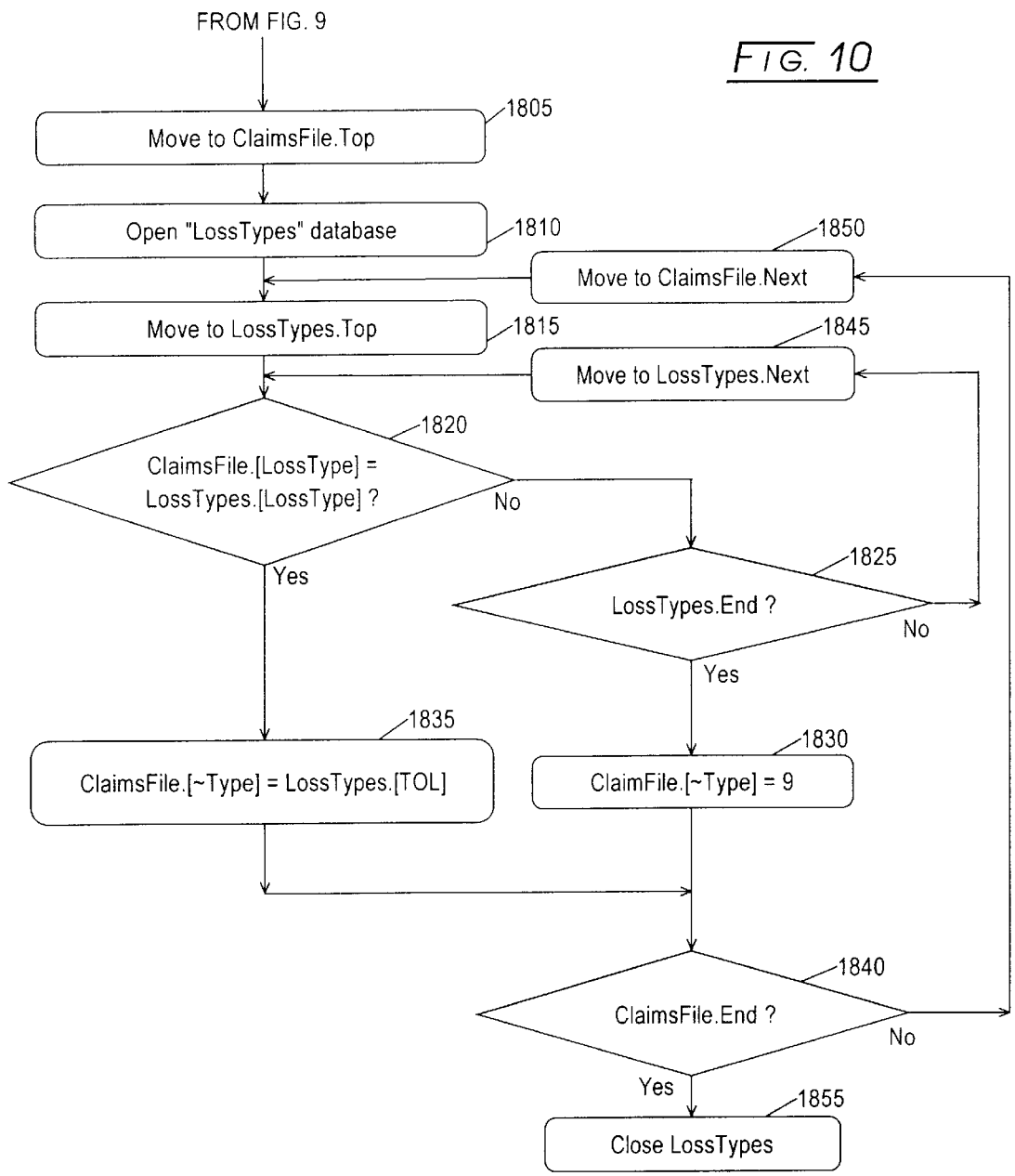
FIG. 10 is a flow chart illustrating a determination of type of loss.

Referring to FIG. 10, the utilization of the LossTypes database as described in conjunction with block 200 in FIG. 3 is set forth. This component of the program functions to cross-reference the standardized types of loss to the types of loss within the raw database until all are positioned within the special ~ field. The program commences by moving to the top of the ClaimsFile as represented at block 1805. Then, the "LossTypes" database is opened as represented at block 1810. Next, as represented at block 1815, the program moves to the top of the LossTypes database and, next, a query is made as represented at block 1820 as to whether the ClaimsFile LossType data matches the corresponding LossType of the LossTypes database. In the event that it does, then as represented at block 1835, the type of loss of the LossType database is written into the ClaimsFile corresponding field. The program then continues to the query at block 1840 determining whether the program is at the end of the ClaimsFile. In the event that it is not, then the program continues or loops as represented at block 1850 to move to the next row of the ClaimsFile, whereupon the procedure is repeated. Where no match is determined to exist in connection with the query at block 1820, then as represented at block 1825, a determination is made as to whether the end of the LossTypes database has been reached. In the event that it has not, then the program continues or loops as represented at block 1845 and the next row of the LossTypes database is accessed.

Where the query posed at block 1825 results in a determination that the program is at the end of the LossTypes database and no match has been found, then, as represented at block 1830, a default arrangement is provided wherein the value 9 is inserted representing "unknown" as discussed above. The program then continues to the query posed at block 1840. Where that query results in a determination that the end of the ClaimsFile has been reached, then, as represented at block 1855, the LossTypes database is closed.

With the completion of this procedure, the "ClaimsFile" standardized database discussed in connection with block 2000 in FIG. 3 has been completed.

FIGS. 11A–11F provide a flowchart describing a preferred technique for generating the CatNodes database described in connection with FIG. 3 at block 3000. This is carried out, in general, utilizing a clustering approach in which catastrophic events or disaster incidents are clustered into related groups by the use of Kohonen neural networks, also referred to as Learning Vector Quantization. As noted earlier, the catastrophic database employed has been described in FIG. 3 at block 700. This database will have, for example, about 20,000 storm reports extending over a time interval of about five years.

Figure 11A:
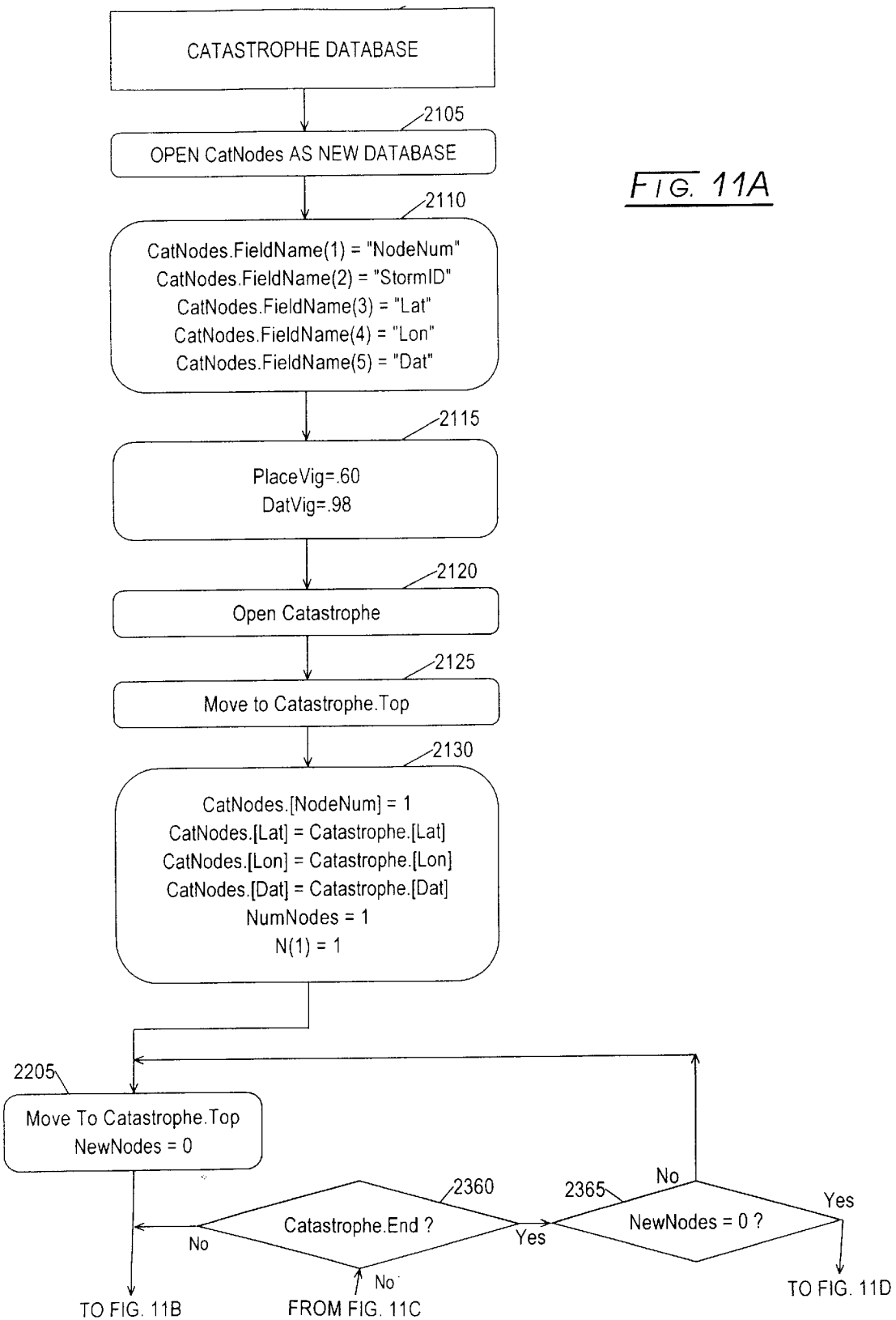

The program commences as represented in FIG. 11A at block 2105 with the opening of CatNodes as a new database. Next, as represented at block 2110, the CatNodes database is structured, being provided with five field names, to wit: "NodeNum", representing node number, "StormID", representing an identification of a storm; "Lat", representing latitude; "Lon", representing longitude; and "Dat", representing the date.

At block 2115, the place vigilance and date vigilance are provided, vigilance sometimes referred to as granularity, is a numeric evaluation representing how large the clusters are to be. In general, the vigilance values are arrived at experimentally and may change depending upon the requirements of the user. With a place vigilance of 0.60, the program will find storms that are within 40% of the continent. Similarly, with a date vigilance value of 0.98, the program will find storms that are within 2% of a year, i.e. about 7 days. In effect, these two vigilance numbers set the fineness of the clusters to be developed. At block 2120, the catastrophe database is opened and as represented at block 2125, the program moves to the top of that catastrophe database. Next, as represented at block 2130, the first storm report is made equal to the first node. Thus, the node number (NodeNum) is made equal to 1 and the latitude and longitude as well as date of that first storm are entered at the corresponding fields. The number of nodes (NumNodes) is set at 1 indicating that one node is existing. Not all storms will satisfy the vigilance requirements established at block 2115. When that situation occurs, then another node is created.

The procedure is seen to continue as represented at block 2205 wherein the program goes to the top of the catastrophe database and a flag, "NewNodes" is set to 0. This NewNodes flag keeps track of whether any new nodes were created upon a given scan through the catastrophe database. In this regard, should the entire catastrophic database be scanned and no new nodes are created, then the program is completed, inasmuch as all nodes satisfy the vigilance requirements. If those vigilance requirements are not satisfied, a new node is created and the program is continued.

Figure 11B:
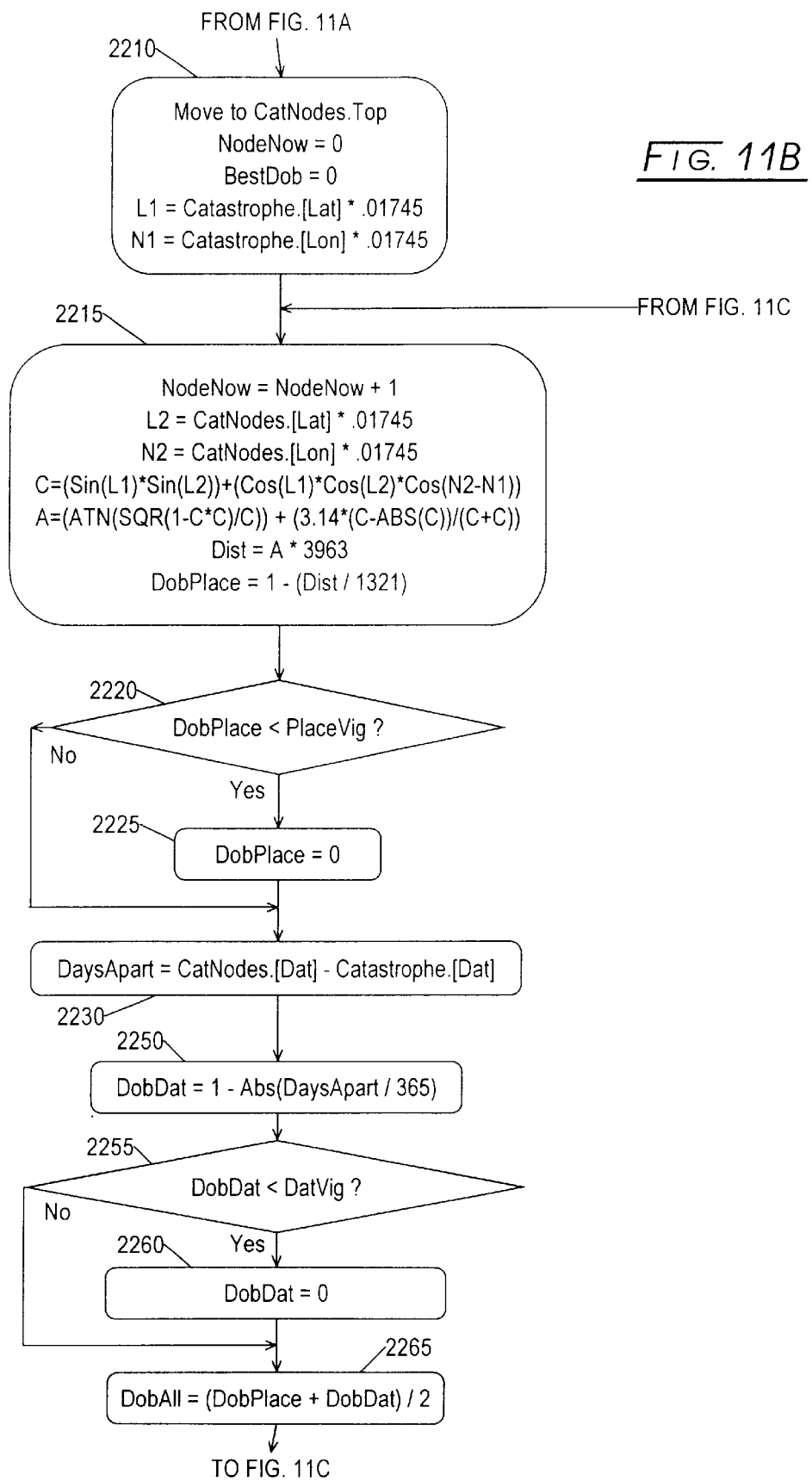

Referring to FIG. 11B at block 2210, the program moves to the top of the CatNodes database being created and, which at this point in such creation has only one record (now designated as a node) in it. A counter identified as "NodeNow" is set to zero. This counter has the purpose of keeping track of which node the program is at. Next, a "BestDob" flag is set to 0. This flag is utilized to keep track of the best match which is found as determined by degree of belonging. Next, the latitude within the catastrophe report, L1, is converted from degrees to radians by the converter value 0.01745 and is entered. Similarly, the longitude, N1, is converted to radians for this first node entry.

At block 2215, the NodeNow counter is incremented by 1, inasmuch as the program is working on the first node at this point in time. The next longitude and latitude, L2, N2 are converted to radians and as represented by the equations within the block, the program arrives at the distance between the two longitude and latitude points in miles. The distance between the two points is A×3963 miles, the latter value being the radius of the earth. The degree of belonging of the next location, DobPlace is computed as 1 minus the above-computed distance divided by the value 1321 which represents ⅓ of the radius of the earth. In effect, that value is a territorial domain which, for illustrative purposes may represent the width or radius of the cones discussed in connection with FIG. 2. While any desired distance value may be utilized, the selection of ⅓ of the radius provides for integer-based computation which is convenient. With the arrangement, should a storm position be 1321 miles away from the cluster location, then the place degree of belonging will be 0.

The program then evaluates the degree of belonging as represented at block 2220. In this regard, a determination is made as to whether the value of the DobPlace is less than the place vigilance, for example, 0.60. Where that is the case, then the place degree of belonging for the (DobPlace) is set to 0 and the program continues. On the other hand, where the test at block 2220 shows that the DobPlace is larger than the value selected for place vigilance, then the program continues to block 2230.

With the instructions at block 2230, the program considers the second or date vigilance requirement (DatVig) to determine whether this next storm report may be associated with the node at hand. Thus, within the noted block, a DaysApart is computed as the difference between the node date, i.e. CatNodes.[Dat] and the storm report date (Catastrophe.[Dat]) At block 2250, the degree of belonging with respect to the date (DobDat) is computed as one less the absolute value of the DaysApart value divided by 365, i.e. a one year time domain. At block 2255, that degree of belonging with respect to date is tested with respect to the vigilance value for date and if it is less than the date vigilance value, then the program sets a 0 value for date degree of belonging as represented at block 2260. Where the test shows that the date degree of belonging meets the vigilance requirement, then the program continues as represented at block 2265 wherein an overall value of degree of belonging (DobAll) is computed. This overall value is the average of the place and date degrees of belonging.

Figure 11C:
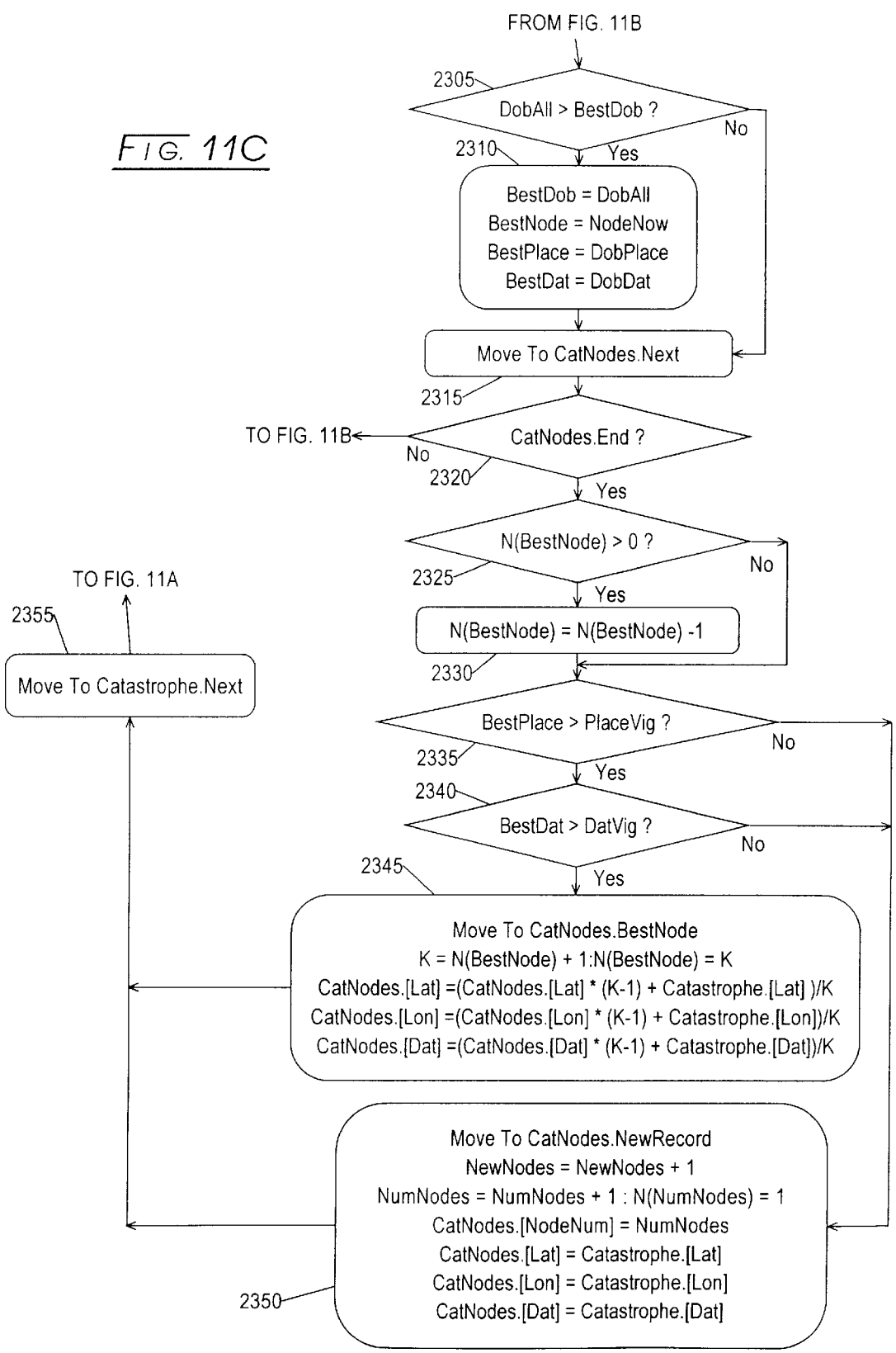

Referring to FIG. 11C, the program then moves to the query posed at block 2305 wherein a determination is made as to whether the overall degree of belonging (DobAll) is greater than the best degree of belonging found thus far. If that is the case, then as represented at block 2310, it is recorded with all associated record parameters. In this regard, the best node (BestNode) is made equal to NodeNow, BestPlace is made equal to the place degree of belonging at hand, and the best BestDat is made equal to the date degree of belonging at hand. As represented at block 2315, the program then moves to the next node. That procedure is undertaken also if the test carried out at block 2305 results in a negative determination. At block 2320, the program determines whether all nodes have been compared with the catastrophic database entries and, if not, the program reverts to block 2215 to determine whether a better matching record exists for the storm node at hand.

Where the query posed at block 2320 results in an affirmative determination and the program is at the end of the CatNodes database. A block 2325, N is the number of reports that have been clustered into this node or cluster a determination is made as to whether the number of reports that have been so clustered is greater than 0. If that is the case, then one is subtracted from that value. This is a heuristic or "work-around" procedure, the subtracted value of 1 being added later. This avoids divide-by-0 errors and the 1 is subtracted unless such subtraction would result in a 0 value. The parenthesis type brackets indicate a subscript and an array. As noted, where a negative determination is made in connection with the query posed at block 2325, the program continues to block 2335. At that block, the program refers to the best place degree of belonging found and a determination is made as to whether that place degree of belonging exceeds the minimum vigilance requirement, PlaceVig. Similarly, as represented at block 2340, a vigilance test is made with respect to the best date (BestDat). These two "if" statements determine whether the program is to create a new node or cluster or whether the instant storm is added into the existing node. With affirmative determinations with respect to each, the program, in effect, adds the storm under consideration into an existing node or cluster. Conversely, where a negative determination is made with respect to either of the tests posed at blocks 2335 and 2340, the program creates a new node just for the storm record at hand. In block 2345, the program sets K equal to the number of storms that have been put into the instant node and that value is incremented by 1, indicating the new storm as being added. The value of N(BestNode) has been incremented by 1 such that the total number of storms associated or attached to the node or cluster at hand has been increased by 1. The next three lines within block 2345 carry out a relocation of the node at hand part way towards the new storm record which is attaching to it. In effect, the program "nudges" the node toward this new storm. The amount of that alteration or "nudge" depends upon how many storms are pre-existing in the node or cluster. Thus, if the node is comprised of only one storm and the second one is now added, the cluster position is moved 50% toward the new storm. On the other hand, if there were ten storms already in the cluster and an eleventh storm is being added, the program moves the node or cluster only 10% toward the new storm location. This arrangement is revealed in the CatNodes, latitude, longitude, and datums being altered by the ratio times (K−1) divided by K. Thus, the latitude of the cluster is moved toward the new storm latitude by the ratio of 1/K as is the longitude moved in accordance with that ratio. Additionally, the date of the cluster is moved toward the new storm by the ratio of 1/K. Thus, as the storm reports are scanned, the nodes or clusters tend to "float" such that, in effect, the nodes or clusters locate themselves in such a way that they attach to the maximum number of storms.

Where the storm under consideration does not meet the vigilance requirements, a new node is created with that singular storm in it. Accordingly, the program moves to the CatNodes database new record and the NewNodes evaluation is incremented by 1. NewNodes is the flag which indicates that a new node has been created. Then, the number of nodes (NumNodes) is incremented by 1 and the number of nodes N(NumNodes) is equal to 1 indicating that there is one storm in this new node. Then, the latitude and longitude and date from the catastrophe database become the corresponding location and date of the new node, at least at the outset.

Upon completion of the tasks of either blocks 2345 and 2350, as represented at block 2355, the program then moves to the next row of the catastrophe database. Returning momentarily to FIG. 11A, at block 2360, a determination is made as to whether the program has reached the end of the catastrophe database. In the event that it has not, then the program continues as represented at block 2210. It may be apparent that the values L2 and N2 at block 2215 are respectively the latitude and longitude of the node or cluster. If the program has scanned through the entire catastrophe database, an affirmative response is developed in connection with block 2360 (FIG. 11A) and, as represented at block 2365, an inquiry is made as to whether any new nodes were created. If new node or cluster were created, a negative determination is at hand and the entire procedure is recommenced allowing the program to create new nodes or clusters as necessary. Thus, the program returns to block 2205. On the other hand, if no new nodes were created, then an affirmative response is developed in connection with the query posed at block 2365. That will indicate that enough nodes or clusters have been developed and they are at the appropriate earth location and time, all vigilance requirements having been satisfied.

Figure 11D:
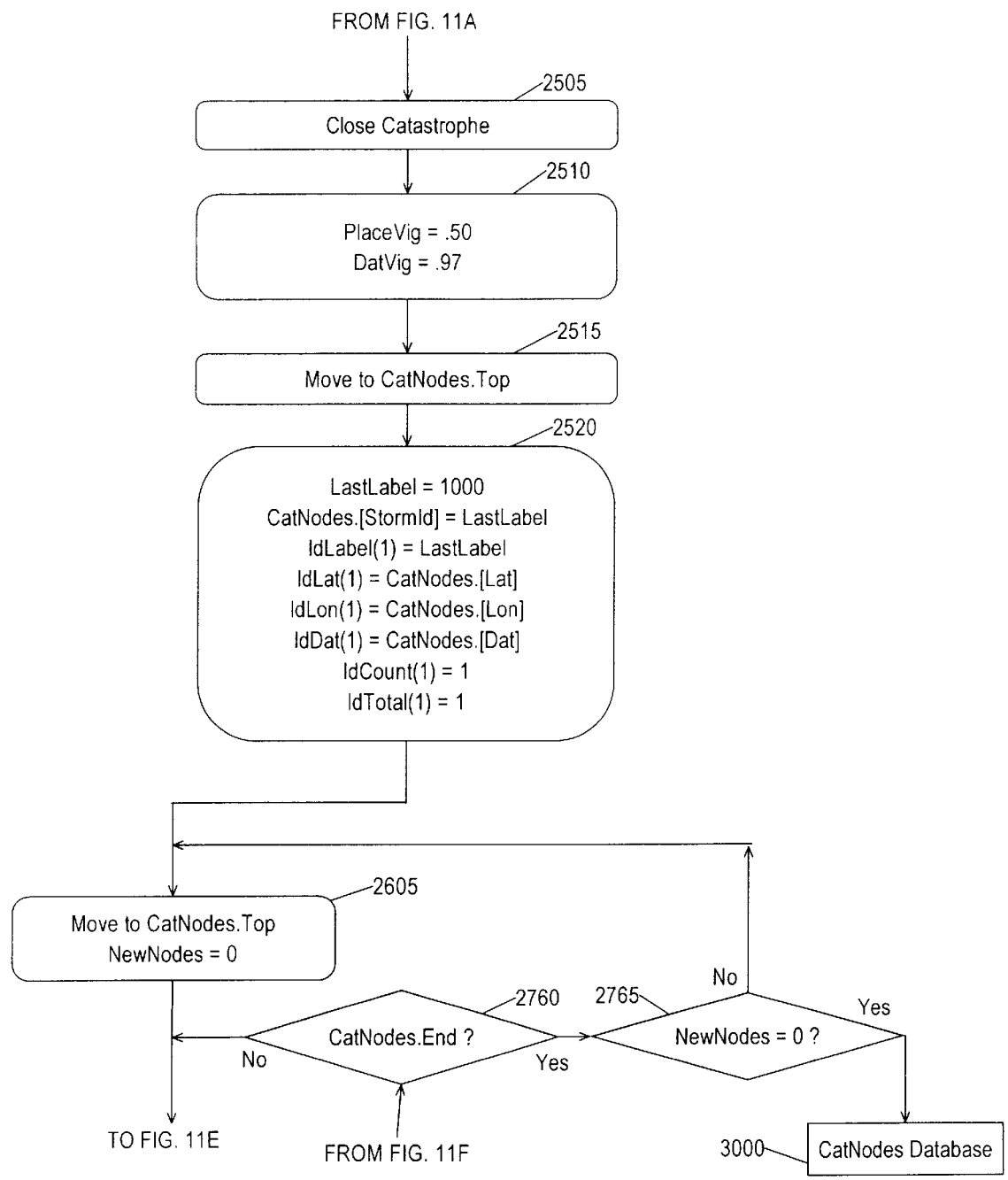
Figure 11F:
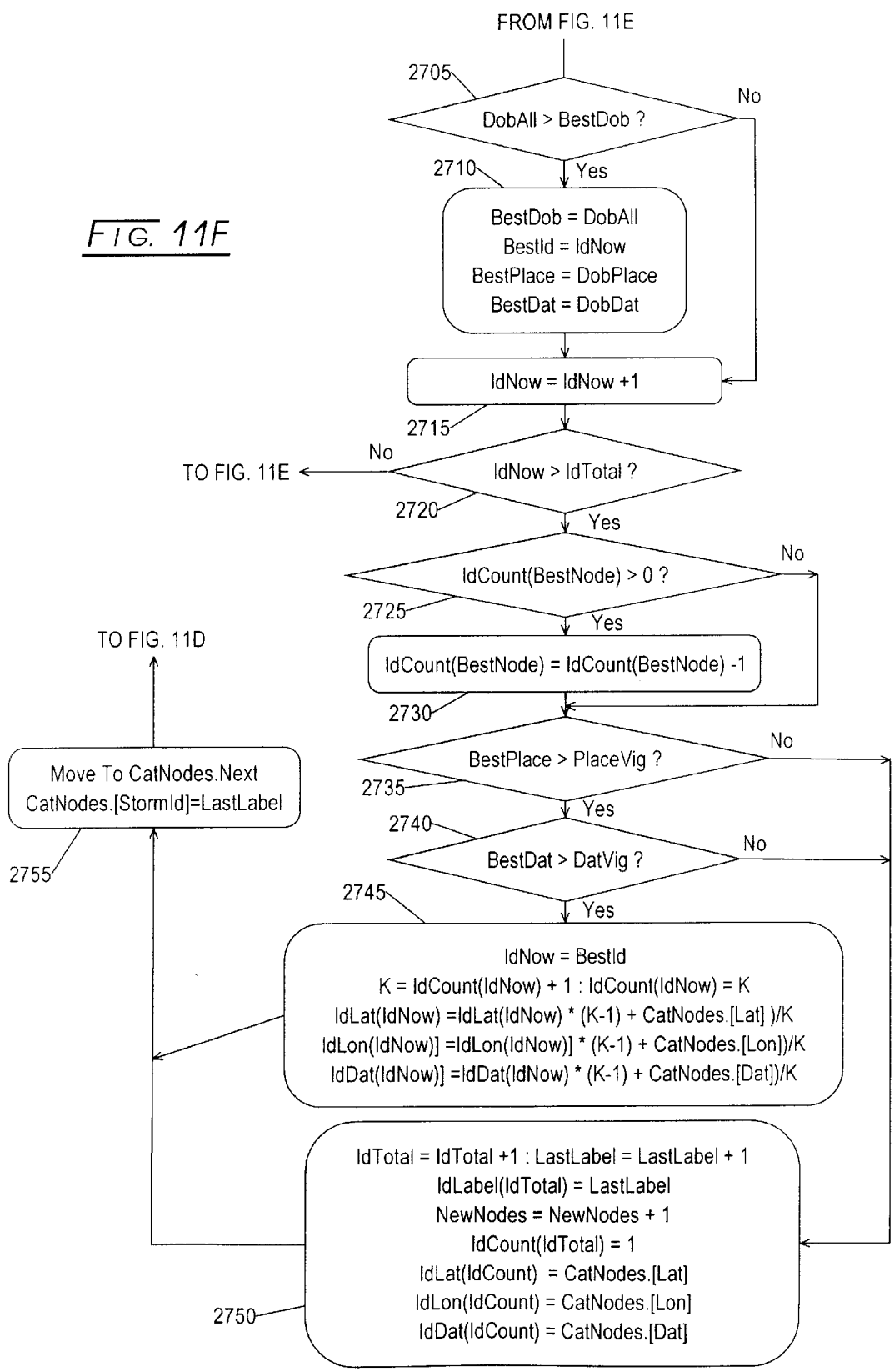

When this affirmative response to the query at block 2365 occurs, the program continues as represented in FIG. 11D to block 2505. At this juncture, the program will carry out what, in effect, is the creation of a cluster of clusters or cluster of nodes. In this regard, the nodes developed in connection with FIGS. 11B and 11C are treated as new storm reports which are subject to a clustering procedure. Accordingly, at block 2505, the catastrophe database is closed, and at block 2510, the place vigilance and date vigilance values are diminished by being altered, respectively, to 0.50 and 0.97. In effect, this clustering of nodes allows for irregular shapes. At block 2515, the program moves to the top of the CatNodes database and, as represented at block 2520, labels are attached to each CatNode node. These labels are to start with the number 1000. While all nodes are to be retained, as they are grouped under the instant procedure, they will receive identical labels. StormId is the field elected to contain these new labels. The IdLabel(1) is merely a memory variable at this point in the program, not being written into any database is made equal to the last label. IdLat(1) is made equal to the CatNode latitude, IdLon(1) is made equal to CatNode longitude, IdDat(1) is made equal to the CatNode date, IdCount(1) is made equal to 1, and IdTotal(1) is made equal to 1. With the above labeling, the program is set-up for the clustering procedure to ensue.

As the procedure continues, a similarity in the process may be observed with respect to FIGS. 11B and 11C. The procedure is seen to recommence with block 2605 providing for moving to the top of the CatNode database and setting the NewNodes count to 0. As before, the first cluster now represents, in effect, the first cluster of clusters. Looking to FIG. 11E and block 2610, the IdNow label is set to 1 and the best degree of belonging is set to 0. The latitude and longitude of the first row of the database as shown at L1 and N1 are converted to radians. The program then continues to block 2615 wherein the latitude and longitude at the cluster node with the IdNow label are converted to radians. This latitude and longitude ultimately will be the "cluster of clusters" earth position identification. This procedure then carries out trigonometric computation to evolve a distance value (for subsequently occurring rows) and a degree of belonging for place (DobPlace) is set equal to 1 minus the value of the distance divided by a territorial domain of one-third of the radius of the earth or 1321 miles. Next, as represented at block 2620, a test is carried out to determine whether the cluster place degree of belonging is less than the place vigilance which now has a value of 0.50. Where that is the case, then the degree of belonging with respect to place is set to zero. Where the test at block 2620 shows that the degree of belonging is greater than the cluster place vigilance, then the program continues to block 2630. As before, the DaysApart value is computed by subtracting the CatNodes node date from the cluster node date IdDate (idNow). The program then continues to block 2650 wherein the node date degree of belonging (DobDat) is computed by subtracting the absolute value of the days apart value divided by the time domain, 365 from 1. Then, as represented at block 2655, the degree of belonging with respect to date is tested against the cluster date vigilance (DatVig). Where the node date degree of belonging is less than the cluster date vigilance value, then, as represented at block 2660, the node degree of belonging with respect to date is set to 0. On the other hand, where the degree of belonging meets the cluster date vigilance test, the program continues to block 2665 and the node over all degree of belonging (DobAll) is computed as the average of the node degree of belonging for place and the node degree of belonging for date. The program then continues to block 2705 (FIG. 11) wherein a determination is made as to whether the all over degree of belonging is greater than the best occurring degree of belonging to have been encountered thus far. Where an affirmative determination is made, then, as represented at block 2710, the BestDob is set equal to the just computed all over node degree of belonging, DobAll; the BestId is set equal to IdNow; the BestPlace degree of belonging is set equal to the newly-developed node degree of belonging with respect to place; and the BestDat is set equal to the currently-developed node degree of belonging with respect to date. The program then continues to block 2715 where the IdNow counter is incremented by 1. In the event that the query at block 2705 results in a negative determination, the same incrementation at block 2715 occurs (for the next cluster node). The program then proceeds to determine whether the IdNow value is greater than the IdTotal or total of all labels. In the event that it is not, then the program continues to block 2615 wherein the IdNow row having been incremented at block 2715, commences to evaluate with respect to a next cluster or cluster nodes. Where an affirmative determination is developed with respect to the query posed at block 2720, then as represented at block 2725, a determination is made as to whether the IdCount(BestNode) is greater than 0. Where it is greater than 0, then a "work-around" adjustment similar to that discussed in connection with block 2330 is carried out, the value 1 being subtracted from the IdCouunt(BestNode).

When the IdCount(Best Node) is not greater than 0, and following the procedure at block 2730, the program continues to the queries at blocks 2735 and 2740 wherein the degree of belonging for the node BestPlace and node Best-Date values are compared with the corresponding cluster vigilance values. Where both tests are met, then the cluster node under consideration is associated with another cluster node in accordance with the procedure at block 2745. As before, a form of "nudging" takes place with respect to both earth location and date. The count, K, again represents how many storms have attached to the cluster at hand and movement in terms of earth location and date is in accordance with the ratio 1/K as discussed in connection with block 2345. Where either of the tests posed at blocks 2735 and 2740 results in a negative determination, then the cluster vigilance requirements have not been satisfied and a new label for a new cluster is developed. Thus, the value IdTotal is incremented by 1 and a new LastLabel is created which is incremented by 1. The NewNodes value is incremented by 1 and IdCount(IdTotal) is made equal to 1. Next, the label identified latitude, longitude, and date are made equal to the corresponding values for this cluster present in the CatNodes database. Following the activities at blocks 2745 and 2750, as represented at block 2755, the next line of the CatNodes database is accessed and the StormId label is filled out. In this regard, rather than create a new cluster, the program fills out an identification label in the existing cluster. As several nodes attach to the new cluster they will receive the same ID number. Returning to FIG. 11A, the program then continues to the query posed at block 2760 wherein a determination is made as to whether the end of the CatNodes database has been reached. In the event that it has not, the program continues to the next row in that database and block 2610. Where the end of the CatNodes database is reached, then as represented at block 2765, a query is made as to whether NewNodes is 0. If the program has looked at all nodes for the instant "cluster of clusters", NewNodes is set to 0, meaning the program has scanned through all of the clusters and has not had to create a cluster of clusters or cluster node. In the event that NewNodes is not equal to 0, then the program continues as represented at block 2605. Where the NewNodes flag is 0, then the CatNodes database 3000 has been completed.

Figure 12:
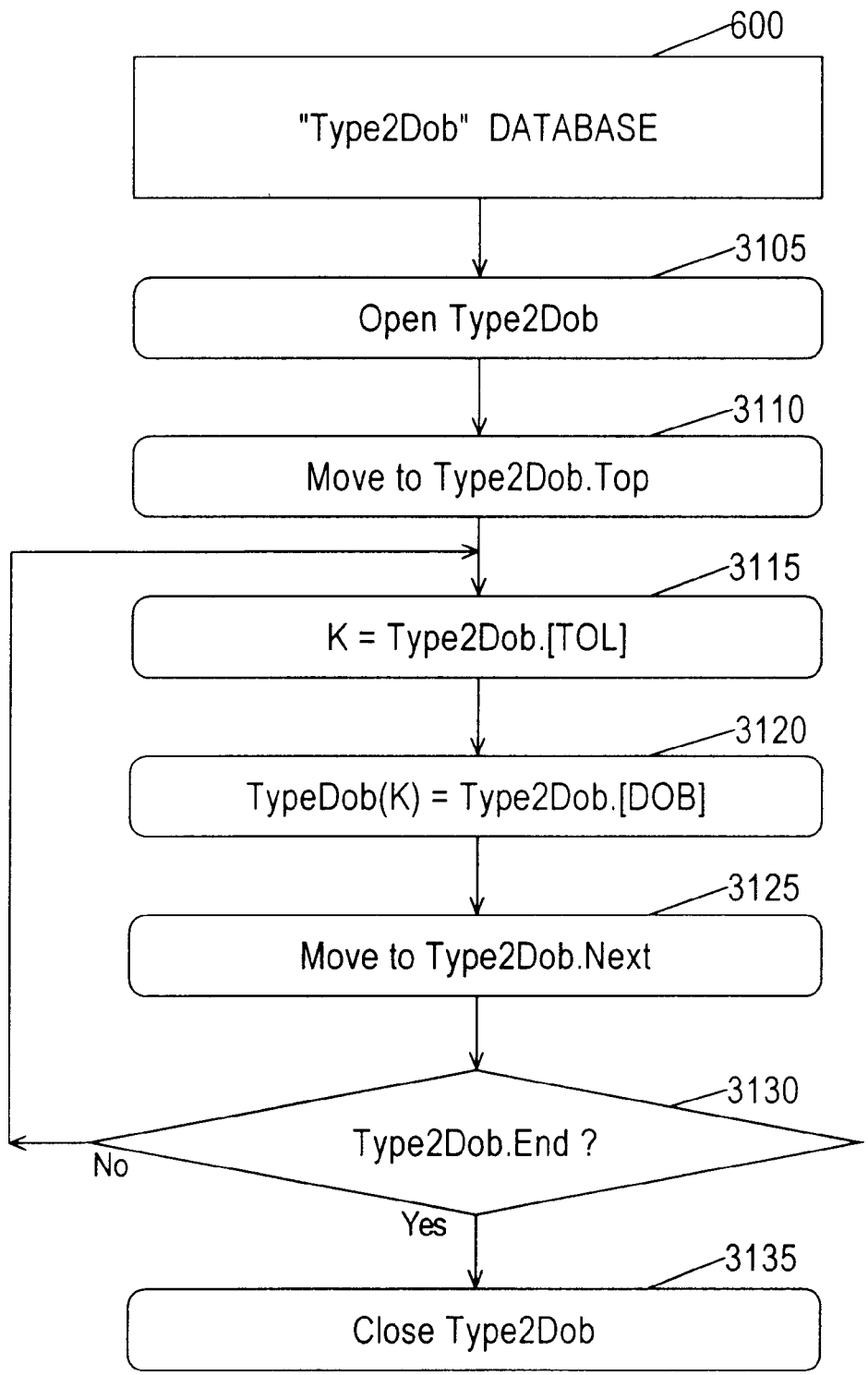
FIG. 12 is a flow chart describing the importation of loss type degrees of belonging.

As described in connection with FIG. 3, block 3100–3900 also performs in conjunction with the Type2Dob database 600. This database 600 is relatively small consisting of 10 rows and typically will be created manually. The database provides a type of loss degree of belonging in correspondence with each claim type. Exemplary claim types have been listed earlier. Referring to FIG. 12, this program commences as represented at block 3105 with the opening of the Type2Dob database and, as represented at block 3110, the program moves to the top of the Type2Dob database. Then, as represented at block 3115, the number K representing the type of loss with a number from 0 to 9 is set equal to whatever is present in the database for the K types. As represented at block 3120, this information is placed in memory as a variable called "TypeDob" and, as represented at block 3125, the program moves to the next row of the Type2Dob database. At block 3130, a determination is made as to whether the program is at the end of the Type2Dob database and, if not, it loops to block 3115, and the program reiterates the procedure until an affirmative determination is made in conjunction with the query at block 3130. Then, as represented at block 3135, the Type2Dob database is closed.

Figure 13:
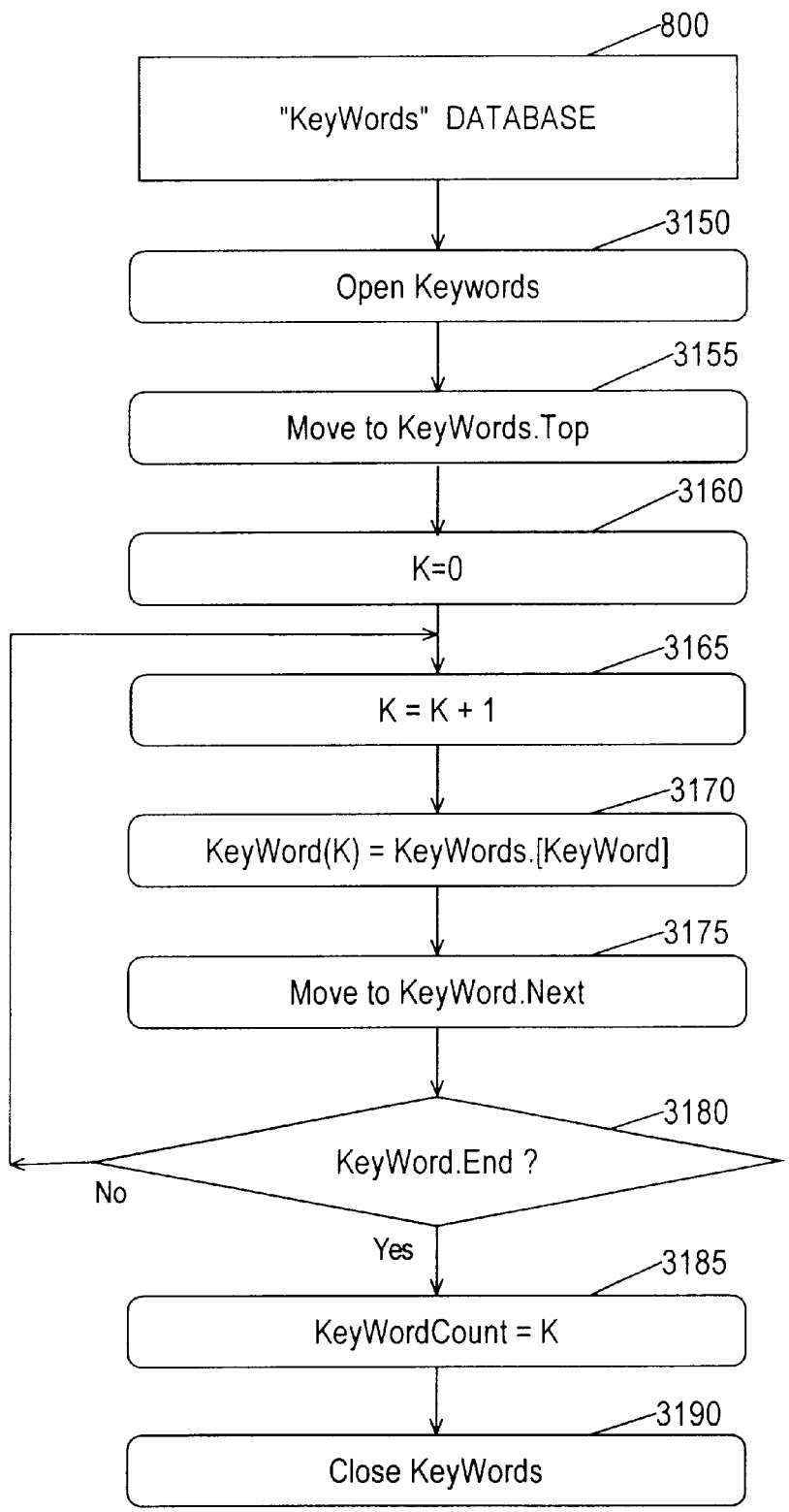
FIG. 13 is a flow chart describing the importation of a keywords array from a keywords database.

FIG. 3 also illustrates that the activities occurring in conjunction with block 3100 to 3900 are carried out in conjunction with a keywords database represented at block 800. Looking to FIG. 13, the approach for reading the keywords database into a memory array, "Keyword (K)" is depicted. In the figure, the keywords database is opened as represented at block 3150, following which, the program moves to the top of that keyword database (block 3155). Next, a counter K is set to 0. At block 3165, the counter K is incremented by 1 and at block 3170, the keyword(K) is made equal to the row keyword in the keywords database. As represented at block 3175, the program then moves to the next row in the keyword database and at block 3180, a query is made as to whether the end of that database has been reached. Where it has not been reached, the program loops to block 3165 and continues. However, where the end of the keyword database is reached, then as represented at block 3185, the keyword count, representing the number of keywords in the database is set equal to K. Then, as represented at block 3190, the keywords database is closed.

Figure 14A:
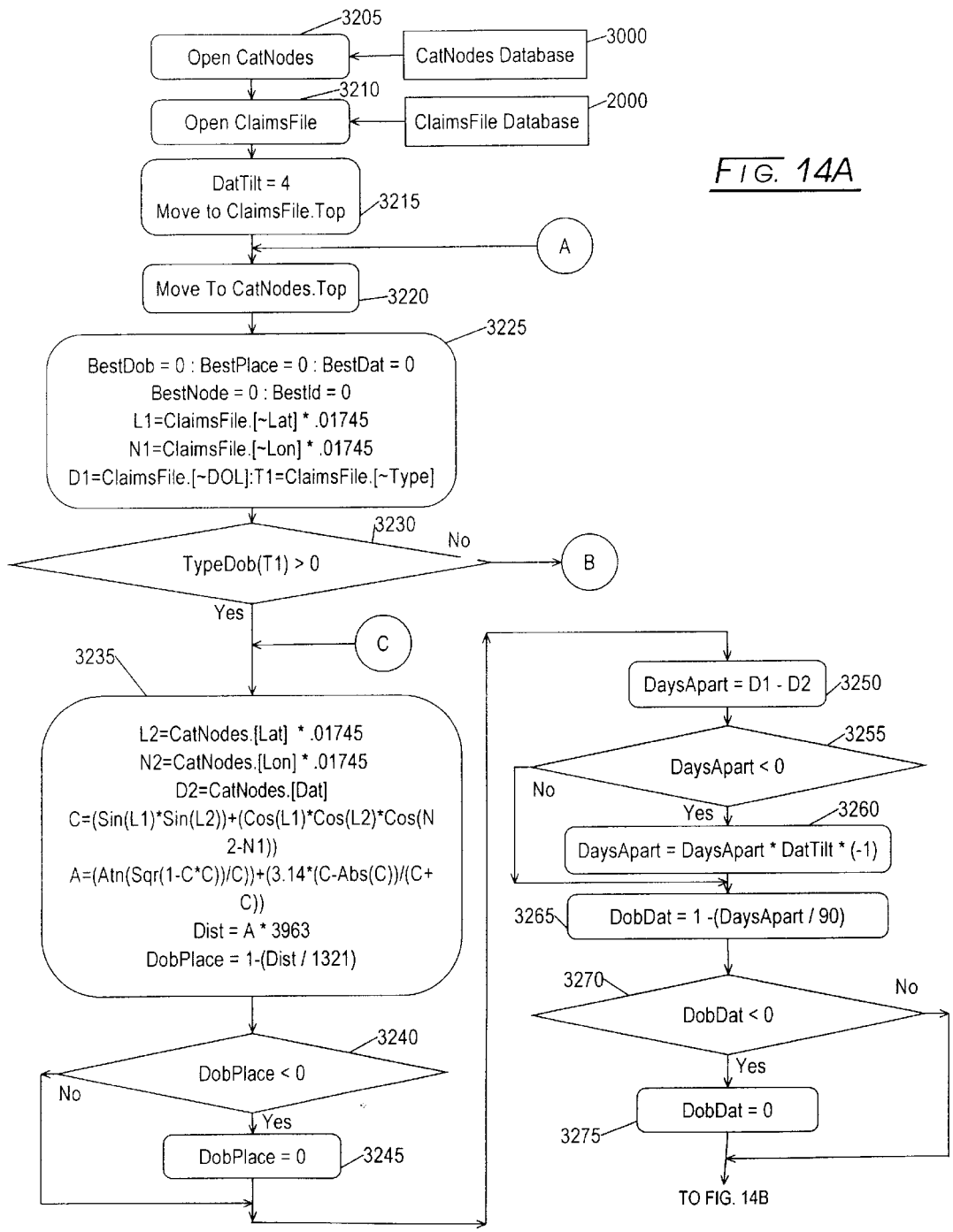

With the development of the Type2Dob database 600, the ClaimsFile standardized claims database 2000 and the CatNodes database 3000, the system then is prepared for carrying out the production of the report 2000 as described in conjunction with block 3100 to 3900 in FIG. 3. The latter block is illustrated in conjunction with the block diagram of FIGS. 14A and 14B. This program functions to step through the ClaimsFile database, one claim at a time, and for every claim in that database, the program is going to step through all of the cluster nodes in the CatNodes database. The best degree of belonging evolved with the process then is adjusted with respect to the type of loss and presence of keywords.

Looking to the subject figures, block 3205 shows that the CatNodes database is opened and block 3210 shows that the ClaimsFile database is opened. The program then progresses as described in connection with block 3216 wherein a factor identified as "DatTilt" is set equal to some value, here shown as 4. This factor produces a penalty for selecting a date of loss occurring before a cluster date. In this regard, if a claimant reports a loss one month after a given storm, statistically, that date is probably a correct one. However, if the loss is reported, for example one month before a storm cluster date, that date is questionable. Accordingly, the DatTilt is a penalty factor which introduces a 4:1 ratio on the degree of belonging. In this regard, a date four weeks after a cluster date will produce the same degree of belonging as a date one week before the cluster date. The arrangement encourages the program to guess behind the report date rather than forwardly ahead of the report date. In effect, a weighting or altering of the shape of the fuzzy logic triangle is evolved with this factor. Additionally provided in conjunction with block 3216 is a call for movement to the top of the ClaimsFile database. The program then continues as represented at block 3220 wherein it moves to the top of the CatNodes database. Then, as represented at block 3225, BestDob is set to 0; BestPlace is set to 0; BestDat is set to 0; BestNode is set to 0; and BestId is set to 0. Latitude L1 and longitude N1 from the ClaimsFile are converted to radians; D1 is set equal to the date of this claim, i.e. the claim under consideration, and T1 is set equal to the type of loss associated with the claim at hand.

The program then continues to the query at block 3230 wherein a determination is made as to whether the TypeDob (T1) is greater than 0. This arrangement saves time since, if the TypeDob is equal to 0, the calculations which follow are not required inasmuch as adjustments are made on this parameter at a later point in the program. In this regard, the TypeDob generally sets the maximum limit on the final degree of belonging. If that value is 0, there is no merit in calculating a final number having an upper limit of 0. For example, a liability claim will have a 0 value degree of belonging.

The program then moves to the computations at block 3235 wherein the distance between the claim at hand and the cluster node being considered is calculated. In this regard, the node latitude and longitude, L2 and N2 are converted to radians and the node date D2 is set equal to the CatNodes database date. Distance then is trigonometrically computed with respect to the positions L1, N1, L2, and N2, and the degree of belonging with respect to position (DobPlace) is computed as 1 minus the value of the distance divided by a territory domain value corresponding with ⅓ of the radius of the earth, i.e. 1321 miles. As discussed above, that value is convenient, providing an integer for use in calculation. However, other values may be selected. Next, as represented at block 3240, the degree of belonging with respect to location (DobPlace) value is compared to 0. Where it is less than 0, then as represented at block 3245, its value is set at 0. Where its value is greater than 0, then the program continues to block 3250 wherein the DaysApart is computed as the difference between D1 and D2. Then, as represented at block 3255, a query is made as to whether the DaysApart value is less than 0. If that test is true, then the negative value indicates a loss report before the cluster date. Where that is the case, then as shown in block 3260, the DaysApart value is adjusted by the DatTilt factor and multiplied by −1 to bring it to an adjusted positive value. Where the test at block 3255 results in a negative determination, the program continues to block 3265 wherein the degree of belonging for the date (DobDat) is set equal to 1 minus the days apart divided by 90. The time domain value of 90 days is experimental, it being determined by experimentation that values beyond 90 days, when used, lack significance, and the program should then be looking at place only and not at time. While the number 90 is utilized, its value is not a critical one to the success of the program. The program then continues to the query at block 3270 determining whether the degree of belonging for the date has a value less than 0. If that is the case, then as shown at block 3275, the degree of belonging for date is set to 0. If the degree of belonging for the date is greater than 0, then the program continues as it does with respect to block 3275 to block 3280. (See FIG. 14B.) At block 3280, the overall degree of belonging (DobAll) is derived as the average of the degree of belonging with respect to place plus the degree of belonging with respect to date. Recalling that the purpose of the instant procedure is to determine for every claim the best matching CatNode, the program then considers the query posed at block 3285. At that block, the just derived overall degree of belonging (DobAll) is compared to the BestDob occurring thus far. Where the comparison shows that the overall DOB is not greater than the best degree of belonging, then the program reverts to block 3295 to move to the next row of the CatNodes database. On the other hand, where the current overall degree of belonging is greater than the BestDob, then, as set forth at block 3290, the thus-derived degrees of belonging are retained in memory. In this regard, BestDob is set equal to DobAll; BestPlace is set equal to DobPlace; BestDat is set equal to the date degree of belonging (DatDob); BestNode then is made equal to the CatNode cluster node number, and the BestId is made equal to the CatNodes StormId. Then, as represented at block 3295, the program moves to the net CatNodes database row. A determination is made at block 3305 as to whether the program now is at the end of the CatNodes database. In the event that it is not, the next row being at hand, the program commences a repeat evaluation in conjunction with block 3235. In the event of an affirmative determination in connection with the query posed at block 3305, it will be known that the best degree of belonging has been determined. In this regard, the program has been through all of the CatNode database and the closest match has been retained in memory.

At block 3310, the program commences to apply the upper limit of the type degree of belonging (TypeDob) by testing whether the BestDob is greater than the TypeDob (T1). In the event that it is greater, then the program moves to a subroutine as represented at block 3315 calling for an adjustment of the best degree of belonging depending upon the type degree of belonging and the possibility of keyword applicability. That subroutine is described in conjunction with FIG. 15. The program then continues to block 3320. Additionally, it may be noted that, where the best degree of belonging is not greater than the type degree of belonging, then the program is directed to this same block. At block 3320, the best matching nodes are recorded into the ClaimsFile database into the afield. Accordingly, the ~field is filled out for overall degree of belonging (~AllDob); type DOB (~TypeDob); place DOB (~PlaceDob); date DOB (~DatDob); the StormID (~StormId); and the storm node (~Node). The program then has obtained the best attachment or association for that particular insurance claim.

At block 3325, the program moves to the next claim or row in the ClaimsFile database. Then, as represented at block 3330, a query is made as to whether the program is at the end of the ClaimsFile. In the event that it is not, then the program evaluates the next claim commencing with block 3220 which moves the program to the top of the CatNodes database. In the event that the program is at the end of the ClaimsFile, then as represented at block 3335, the CatNodes file is closed and the ClaimsFile is closed. The program thus has produced the ClaimsFile as described at block 2000 in FIG. 3 wherein the best matches with an identified storm (CatId) and associated degrees of belong (DOBs) are retained.

Figure 15:
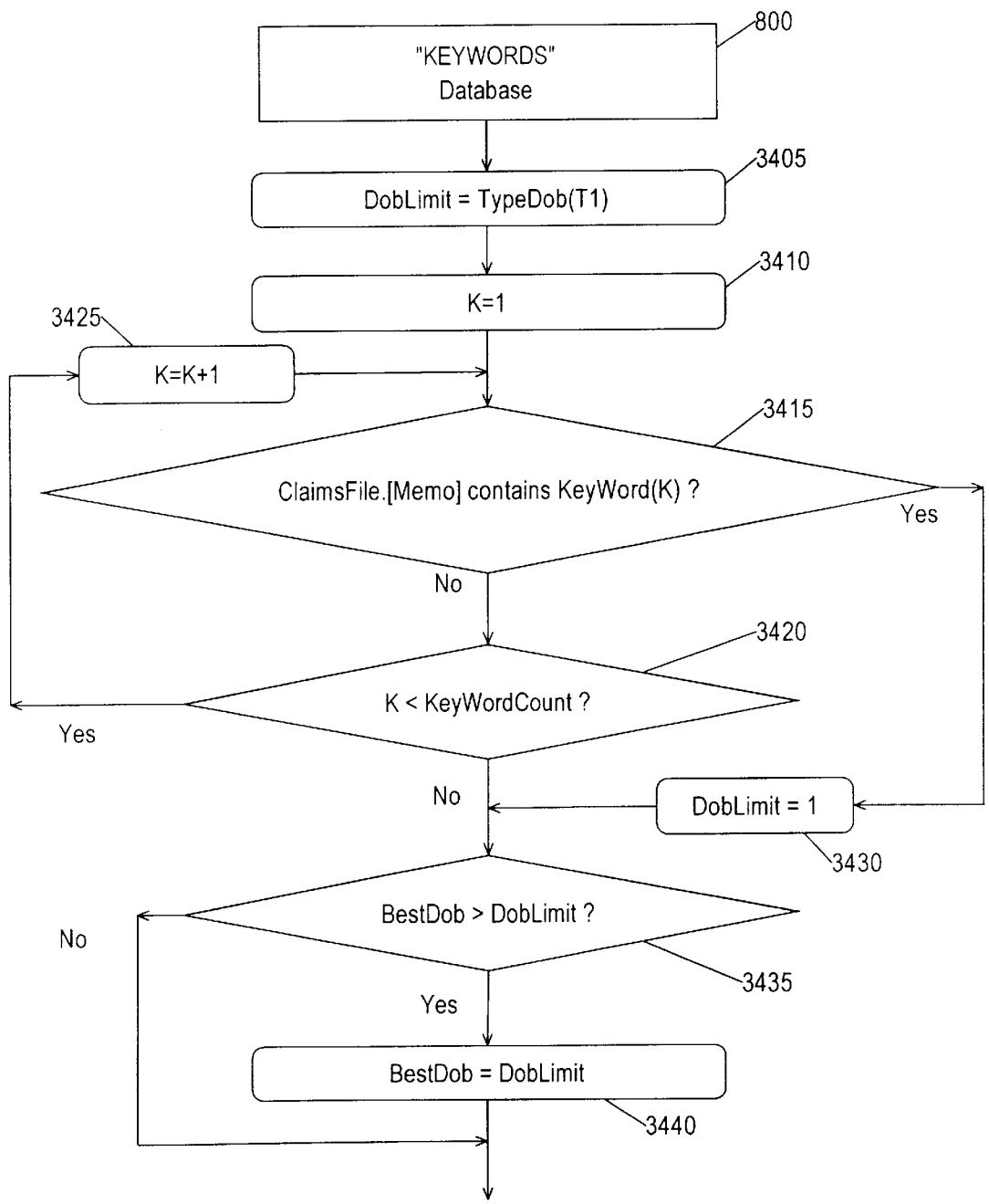
FIG. 15 is a flow chart describing a subroutine for adjusting the best degree of belonging.

Looking to FIG. 15, the subroutine called at block 3315 is revealed in flow chart fashion. This subroutine operates in conjunction with the keywords database and, as set forth at block 3405, sets the limit of the degree of belonging (DobLimit) equal to the TypeDob$_{T1}$. Thus, the degree of belonging limit is set to the value indicated by the type of loss for this given claim. At block 3410, the counter, K, is set equal to 1. Then, as set forth at block 3415, a query is made as to whether the ClaimsFile contains any keywords. In the event of an affirmative determination that a keyword is present, then as represented at block 3430, the DobLimit is set to 1 which is an unlimited indicator.

Where the determination at block 3415 is that no keywords are present, then as represented at block 3420, a test is made as to whether the value K is less than the keyword count, i.e. the number of keywords in the database. In the event of an affirmative determination, as represented at block 3425, K is incremented by 1 and the program continues to loop searching for a possible keyword match.

Where the value K is equal to the keyword count, then the program continues to the query at block 3435 and a determination is made as to whether the best degree of belonging is greater than the degree of belonging limit. In the event of an affirmative determination, then as represented at block 3440, the best degree of belonging is set equal to the degree of belonging limit and the program continues to block 3320 in FIG. 14. That block is accessed directly with a negative determination with respect to the query posed at block 3435.

The ClaimsFile as is now produced may be utilized by an insuring organization in a variety of manners. A popular utilization is one wherein the user or insurer selects a target CatId and degree of belonging threshold as discussed in connection with block 4100 to 4190 in FIG. 3. This generates a hits database for that target storm or CatId.

Figure 16:
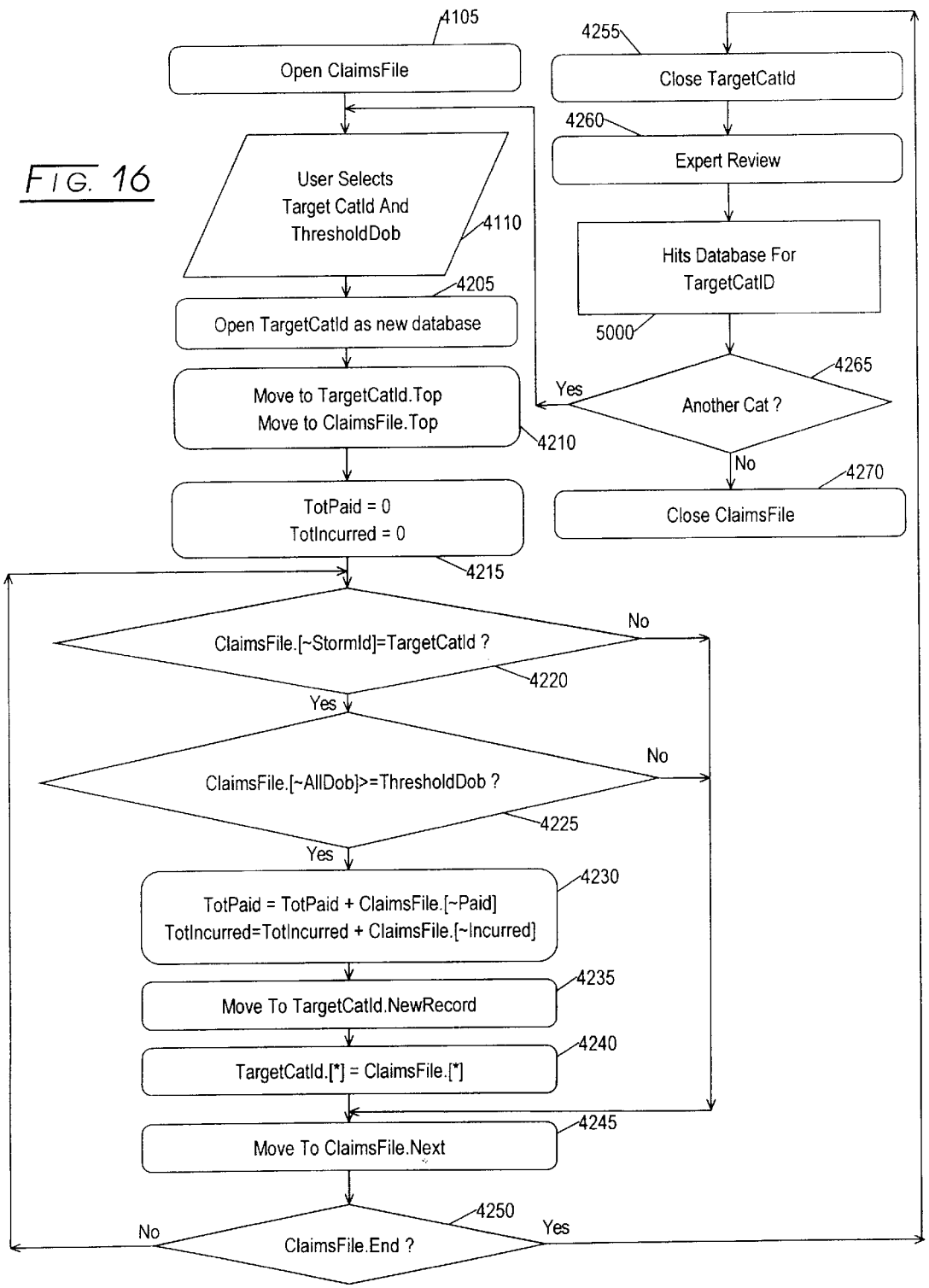
FIG. 16 is a flow chart describing the generation of a hits database according to the invention.

Referring to FIG. 16, the procedure for producing a report 5000 is revealed in flow diagrammatic fashion. In the figure, the procedure is commenced with the opening of the ClaimsFile as represented at block 4105. At this point in time, the ClaimsFile database has the columns filled out associating claims with storms and how well those claims are associated with a given storm.

As represented at block 4110, the user determines their report criteria as to which storm and degree of belonging threshold with which the claims are to be associated. Upon indicating those two criteria, the program opens a new database by the name of the storm upon which the investigation is to be made. Thus, TargetCatId is opened as a new database. Then, as represented at block 4210, the program moves to the top of the TargetCatId and additionally moves to the top of the ClaimsFile database. Next, as represented at block 4215, the totals paid and totals incurred are set to 0 and the program commences scanning through the ClaimsFile. At block 4220, the query is made as to whether the ~StormId field in the ClaimsFile is equal to the storm which the system is looking for, i.e. TargetCatId. In the event of an affirmative determination, then as represented at block 4225, a query is made as to whether the pertinent all over degree of belonging is greater than the threshold degree of belonging selected by the user. In the event of an affirmative response, then the target storm has been located and the minimum threshold requirements selected by the user have been exceeded. Accordingly, as represented at block 4230, the total paid tally is incremented by the ~Paid field in the ClaimsFile and the total incurred value is incremented by the amount in the ~Incurred field of the ClaimsFile. Then, as represented at block 4235, the program moves to the next record in the target report table. Recordation in the new record table also is represented at block 4240 wherein all fields are recorded in the TargetCatId. Next, as represented at block 4245, the next ClaimsFile record is accessed. This same movement to the next record occurs in the event of a negative determinations with respect to the queries posed at either blocks 4220 or 4225. Following movement to the next ClaimsFile record, as represented at block 4250, the program queries as to whether the end of the ClaimsFile has been reached. In the event that it has not, then the program loops to block 4220. However, where the end of the ClaimsFile has been reached, then the program proceeds to block 4255 and closes the TargetCatId, the report described at block 5000 in FIG. 3 having been completed.

The system also incorporates a "keeper" field which permits an expert to manually review the final report by clicking with a mouse or the like on a keeper field, the expert may indicate agreement with a final result. The program publishes a checkmark in the keeper field to indicate agreement. This manual intervention feature is represented at block 4260. FIG. 17 reveals a typical screen published for this intervention purpose. The checkmark also can be toggled in or off by pressing the space bar of the terminal being utilized.

Returning to FIG. 16, the hits database for the TargetCatId is represented again at block 5000. As represented at block 4265, the program will inquire as to whether the user wishes to investigate another storm. In the event of an affirmative determination, the program returns to block 4110. Where no further reports are desired, as represented at block 4270, the ClaimsFile is closed.

Since certain changes may be made in the above-described system and method without departing from the scope of the invention herein involved, it is intended that all matter contained in the description thereof or shown in the accompanying drawings shall be interpreted as illustrative and not in a limiting sense.

We claim:

1. A method for identifying insurance claims having a relationship with reinsurance related catastrophic events, comprising the steps of:

providing a catastrophic database having identified cluster nodes of catastrophic events derived by reported parameters, each said cluster node having an earth position parameter, and a date of occurrence parameter;

providing an insurance claims database of claim reports, each such claim report thereof having, an earth location datum and a date datum;

deriving a place degree of belonging for each said earth location datum of each said claim report with respect to each said cluster node earth position parameter;

deriving a date degree of belonging for each said date datum of each said claims report with respect to each said date of occurrence parameter;

selecting a said identified cluster node for each said claim report as that best cluster node optimally corresponding with the derived place degree of belonging and date degree of belonging; and generating a tabular claims file compilation incorporating data from each said claim report, each said claim report being associated with said selected identified best cluster node, with said best place degree of belonging and date degree of belonging.

2. A method for producing, from a memory retained group of insurance claim reports, a compilation of insurance claims having a relationship with catastrophes for which reinsurance coverage is applicable, comprising the steps of:

providing a city database wherein a plurality of cities name entries are retained in memory, each being retained in combination with geographic coordinates identifying their position on earth;

opening a claims database having fields including a loss city field, a loss state field, a claim identification field, and a loss date field;

importing claim data available from each said claim report of said memory retained group of insurance claims reports into corresponding said fields;

for each said claim report, scanning said city database to identify a city name match and retaining said geographic coordinates as claim geographic coordinates in memory in conjunction with said claims report when a city name match occurs;

providing a catastrophic database having identified clusters of catastrophic events derived by reported parameters, each said cluster having an earth position parameter and a date of occurrence parameter;

deriving a degree of belonging corresponding with each said claim geographic coordinates with respect to each said cluster earth position parameter, and corresponding with each said loss date of each said claim report with respect to each said cluster date of occurrence parameter;

selecting the best cluster representing a best said degree of belonging for each said claim report; and generating a tabular claims file compilation incorporating data from each said claim report, each said claims report tabulated therein being combined with said selected best cluster of catastrophic events.

3. The method of claim 2 including the steps of:

providing a zip code database wherein a plurality of postal zip codes are retained in memory in combination with geographic coordinates identifying their position on earth; and for each said claim report, scanning said zip code database to identify a zip code match in the absence of a city name match and retaining said geographic coordinates as claim geographic coordinates in memory in conjunction with said claim report when a zip code match occurs.

4. The method of claim 3 including the steps of:

providing a telephone number database wherein a plurality of components of telephone numbers are retained in memory in combination with geographic coordinates identifying their position on earth; and for each said claim report, scanning said telephone number database to identify a telephone number match in the absence of a said zip code match and retaining said geographic coordinates as claims geographic coordinates in memory in conjunction with said claims report when a telephone match occurs.

5. The method of claim 4 in which:

said city database is provided having a state name entry in conjunction with each said city name and is provided having a state average entry in conjunction with a said state name entry, each said state average entry being retained in memory in combination with geographic coordinates identifying a predetermined state contained position on earth; and including the step:

for each said claim report, scanning said city database to identify a state name match in the absence of a said telephone match and further scanning said city database to identify that state average entry corresponding with said state name match, and retaining said geographic coordinates identifying a predetermined state contained position on earth as claim geographic coordinates in memory when said state average entry is identified.

6. The method of claim 3 including the steps of:

providing a telephone number database wherein a plurality of components of telephone numbers are retained in memory in combination with geographic coordinates identifying their position on earth; and for each said claim report, scanning said telephone number database to identify a telephone number match in the absence of a said city name match and retaining said geographic coordinates as claims geographic coordinates in memory in conjunction with said claims report when a telephone match occurs.

7. The method of claim 3 in which:

said city database is provided having a state name entry in conjunction with each said city name and is provided having a state average entry in conjunction with a said state name entry, each said state average entry being retained in memory in combination with geographic coordinates identifying a predetermined state contained position on earth; and including the step:

for each said claim report, scanning said city database to identify a state name match in the absence of a said zip code match and further scanning said city database to identify that state average entry corresponding with said state name match, and retaining said geographic coordinates identifying a predetermined state contained position on earth as claim geographic coordinates in memory when said state average entry is identified.

8. The method of claim 2 in which:

said city database is provided having a state name entry in conjunction with each said city name; and including the step:

for each said claim report, scanning said city database to identify a state name match in the presence of a said city name match and carrying out a retention of said geographic coordinates as clam geographic coordinates in memory only in the presence of both said city name match and said state name match.

9. The method of claim 2 in which:

said city database is provided having a state name entry in conjunction with each said city name and is provided having a state average entry in conjunction with a said state name entry, each said state average entry being retained in memory in combination with geographic coordinates identifying a predetermined state contained position on earth; and including the step:

for each said claim report, scanning said city database to identify a state name match in the absence of a said city name match and further scanning said city database to identify that state average entry corresponding with said state name match, and retaining said geographic coordinates identifying a predetermined state contained position on earth as claim geographic coordinates in memory when said state average entry is identified.

10. The method of claim 2 including the steps of:

providing a loss types database wherein a plurality of predetermined types of insurable loss entries are retained in memory;

said importing claim data step includes the step of importing loss data from said claim reports into a corresponding loss type field to provide a loss type entry in association with each said claim report;

providing a loss-type to degree of belonging database wherein each of said predetermined types of insurable loss entries are assigned a loss-type degree of belonging;

said step of selecting said best cluster is carried out in conjunction with said loss-type degree of belonging when the value thereof is less than the value of said best degree of belonging.

11. A method for identifying insurance claim having a relationship with reinsurance related catastrophic events, comprising the steps of:

(a1) providing a catastrophic database as a memory retained compilation of catastrophic event records, each such record having an event identification, a date of event occurrence, and a catastrophic geographic coordinate identifying its position on earth;

(a2) selecting a first place vigilance value;

(a3) selecting a first date vigilance value;

(a4) opening a catnodes database;

(a5) selecting an initial node as one said event record with a node coordinate and a node date corresponding respectively with said catastrophic geographic coordinates and said date of event occurrence;

(a6) scanning said catastrophic database and for each record thereof, deriving a place degree of belonging in correspondence with said node coordinate and said catastrophic geographic coordinate, and further deriving a date degree of belonging in correspondence with said node date and said date of event occurrence;

(a7) comparing the value of said place degree of belonging with the said first place vigilance value and diminishing said place degree of belonging when the value thereof is less than said first place vigilance value;

(a8) comparing the value of said date degree of belonging with said first date vigilance value and diminishing said date degree of belonging when the value thereof is less than said first date vigilance value;

(a9) determining an overall degree of belonging in correspondence with said place degree of belonging and said date degree of belonging;

(a10) determining a best degree of belonging from all overall degree of belonging values derived from said scanning step (a6) and assigning the place degree of belonging and the date degree of belonging corresponding with said best degree of belonging respectively as best place degree of belonging and best date degree of belonging;

(a11) creating a new node corresponding with that event record deriving said best degree of belonging when the value of said best place degree of belonging is less than said first place vigilance value or when the value of said best date degree of belonging is less than said first date vigilance value;

(a12) entering said new node into said catnodes database;

(a13) adjusting said node coordinates and said node date in correspondence with said best place degree of belonging and best date degree of belonging when the value of said best place degree of belonging is greater than said first place vigilance value and said best date degree of belonging is greater than said first date vigilance value;

(a14) reiterating steps (a6) through (a13) for each new node created to form a catnodes database;

(b) providing an insurance claims database of claim reports, each such claim report thereof having claim place geographic coordinates identifying a position on earth and a claim loss date;

(c) deriving a claim place degree of belonging corresponding with each of said claim place geographic coordinates with respect to each said node coordinate of said catnodes database;

(d) deriving a claims date degree of belonging corresponding with each said claim loss date with respect to each said node date of said catnodes database;

(e) deriving a claims overall degree of belonging corresponding with each said claims place degree of belonging and said claim loss date degree of belonging;

(f) selecting the best node of said catnodes database representing a best overall degree of belonging for each said claim report; and generating a tabular ClaimsFile compilation incorporating data from each said claim report, each said claim report tabulated therein being combined with said selected best node.

12. The method of claim 11 including the step:

(a15) amalgamating said created nodes into cluster nodes in accordance with a cluster place vigilance value less than said first place vigilance value and in accordance with a cluster date vigilance value less than said first date vigilance value.

13. The method of claim 11 in which said step (a6) includes the steps of:

(a6i) determining the distance between said node coordinates and said catastrophic, geographic coordinates; and (a6ii) deriving said place degree of belonging as the value of one minus the value of said distance divided by the value of a predetermined terrestrial domain representing a predetermined distance extending from the location of said node coordinates.

14. The method of claim 13 in which said predetermined distance is an integer fraction of the radius of the earth.

15. The method of claim 13 in which said step (a7) diminishes said place degree of belonging to zero when the value thereof is less than said first place vigilance value.

16. The method of claim 13 in which said step (a6) includes the steps of:

(a6iii) determining the days apart interval between said node date and said date of event occurrence; and (a6iv) deriving said date degree of belonging as the value of one minus the value of said days apart interval divided by a predetermined time domain.

17. The method of claim 16 in which said predetermined time domain is a predetermined number of days.

18. The method of claim 17 in which said predetermined number of days is 365.

19. The method of claim 16 in which said step (a8) diminishes said date degree of belonging to zero when the value thereof is less than said first date vigilance value.

20. The method of claim 11 in which said step (a9) overall degree of belonging is the average of said place degree of belonging and said date degree of belonging.

21. The method of claim 11 in which said step (a11) includes the step of:

(a11i) assigning said new node said corresponding event record date of occurrence and catastrophic geographic coordinates.

22. The method of claim 11 in which said step (a13) includes the steps of:

(a13i) determining the number, K, of adjustments which will have been made to said node to be adjusted;

(a13ii) adjusting said node coordinates toward the catastrophic geographic coordinates of that record corresponding with said best place degree of belonging in correspondence with the ratio 1/K; and (a13iii) adjusting said node date toward the record date of event occurrence corresponding with said best date degree of belonging.

23. The method of claim 11 including the steps of:

(a15) selecting a second place vigilance value less than said first place vigilance value;

(a16) selecting a second date vigilance value less than said first date vigilance value;

(a17) selecting an initial cluster node from said catnodes database and assigning it a cluster identifier;

(a18) scanning said catnodes database and for each scanned node thereof deriving a node place degree of belonging with respect to the identifier assigned node node coordinate and the node coordinates of said scanned node, and further deriving a node date degree of belonging with respect to the identifier assigned node node date and the node date of said scanned node;

(a19) comparing the value of said node place degree of belonging with said second place vigilance value and diminishing said node place degree of belonging when the value thereof is less than said second place vigilance value;

(a20) comparing the value of said node date degree of belonging with said second date vigilance value and diminishing said node date degree of belonging when the value thereof is less than said second date vigilance value;

(a21) determining a node overall degree of belonging in correspondence with said node place degree of belonging and said node date degree of belonging;

(a22) determining a node best degree of belonging from all node overall degree of belonging values derived from said scanning step (a18) and assigning the node place degree of belonging and the node date degree of belonging corresponding with said node best degree of belonging respectively as node best degree of belonging and node best date degree of belonging;

(a23) creating a new cluster node and assigning a next cluster identifier thereto with that scanned node deriving said node best degree of belonging when the value of said node best place degree of belonging is less than said second place vigilance value or when the value of said node best date degree of belonging is less than said second date vigilance value;

(a24) entering said new cluster node into said catnodes database;

(a25) adjusting said cluster node node coordinates and node date in correspondence with said node best place degree of belonging and node best date degree of belonging when the value of said node best place degree of belonging is greater than said second place vigilance value and said node best date degree of belonging is greater than said second date vigilance value; and (a26) reiterating steps (a18) through (a25) for each new cluster node created.

24. The method of claim 23 in which said step (a18) includes the steps of:

(a18i) determining the distance between the node coordinates of said cluster node and the node coordinates of the scanned node; and (a18ii) deriving said node place degree of belonging as the value of one minus the value of said distance divided by the value of a predetermined terrestrial domain representing a predetermined distance extending from the location of the cluster node coordinates.

25. The method of claim 24 in which said predetermined distance is an integer fraction of the radius of the earth.

26. The method of claim 24 in which said step (a18) diminishes said node place degree of belonging to zero when the value thereof is less than said second place vigilance value.

27. The method of claim 24 in which said step (a20) includes the steps of:

(a20iii) determining the days apart interval between the node date of the cluster node and the node date of the scanned node; and (a20iv) deriving said node date degree of belonging as the value of one minus the value of said days apart interval divided by a predetermined time domain.

28. The method of claim 27 in which said predetermined time domain is a predetermined number of days.

29. The method of claim 28 in which predetermined number of days is 365.

30. The method of claim 27 in which said step (a20) diminishes said node date degree of belonging to zero when the value thereof is less than said second date vigilance value.

31. The method of claim 23 in which said step (a21) node overall degree of belonging is the average of said node place degree of belonging and said node date degree of belonging.

32. The method of claim 23 in which said step (a25) includes the steps of:

(a25i) determining the number, K, of adjustments which will have been made to said cluster node to be adjusted;

(a25ii) adjusting said cluster node coordinates toward the node coordinates of the scanned node corresponding with said node best degree of belonging in accordance with the ratio 1/K; and (a25iii) adjusting the cluster node date toward the scanned node date corresponding with the node best date degree of belonging.

33. A method for identifying insurance claims having a relationship with reinsurance related catastrophic events, comprising the steps of:

providing a catastrophic database having identified cluster nodes of catastrophic events derived by reported parameters, each said cluster node having an earth position parameter, and a date of occurrence parameter;

providing an insurance claims database of claim reports, each such claim report thereof having an earth location datum and a date datum;

deriving a place degree of belonging for each said earth location datum of each said claim report with respect to each said cluster node earth position parameter;

deriving a date degree of belonging for each said date datum of each said claims report with respect to each said date of occurrence parameter;

selecting a said identified cluster node for each said claim report as that best cluster node optimally corresponding with the derived place degree of belonging and date degree of belonging by:

selectively combining the values of said place degree of belonging and said date degree of belonging to derive an overall degree of belonging, and selecting said optimally corresponding best cluster node as that cluster node corresponding with the best said overall degree of belonging; and generating a tabular claims file compilation incorporating data from each said claim report, each said claim report being associated with said selected identified best cluster node, with said best place degree of belonging and date degree of belonging.

34. The method of claim 33 in which:

said insurance claims database is provided including a loss-type datum for each said claim report; each said loss-type datum being provided from a group of designated types of loss;

each said loss-type datum of said group of designated types of loss having a predetermined type of loss degree of belonging assigned thereto; and said step of selecting said optimally corresponding best cluster node is carried out in conjunction with said predetermined type of loss degree of belonging when the value thereof is less than the value of said best overall degree of belonging.

35. The method of claim 34 in which:

said insurance claims database is provided including a memo datum corresponding with a said claim report;

including the steps of:

providing a keywords database formed of a plurality of predetermined keywords, determining the presence of a said predetermined keyword within said memo datum; and disregarding said type of loss degree of belonging when a said predetermined keyword is determined to be present within said memo datum.

36. A method for identifying insurance claims having a relationship with reinsurance related catastrophic events, comprising the steps of:

providing a catastrophic database having identified cluster nodes of catastrophic events derived by reported parameters, each said cluster node having an earth position parameter, and a date of occurrence parameter;

providing an insurance claims database of claim reports, each such claim report thereof having an earth location datum and a date datum;

deriving a place degree of belonging for each said earth location datum of each said claim report with respect to each said cluster node earth position parameter;

deriving a date degree of belonging for each said date datum of each said claims report with respect to each said date of occurrence parameter;

selecting a said identified cluster node for each said claim report as that best cluster node optimally corresponding with the derived place degree of belonging and date degree of belonging;

generating a tabular claims file compilation incorporating data from each said claim report, each said claim report being associated with said selected identified best cluster node, with said best place degree of belonging and date degree of belonging;

selecting a target identified cluster node; and compiling a tabulation of all said claim records wherein said target identified cluster node is said best cluster node.

37. A method for identifying insurance claims having a relationship with reinsurance related catastrophic events, comprising the steps of:

providing a catastrophic database having identified cluster nodes of catastrophic events derived by reported parameters, each said cluster node having an earth position parameter, and a date of occurrence parameter;

providing an insurance claims database of claim reports, each such claim report thereof having an earth location datum and a date datum;

deriving a place degree of belonging for each said earth location datum of each said claim report with respect to each said cluster node earth position parameter;

deriving a date degree of belonging for each said date datum of each said claims report with respect to each said date of occurrence parameter;

selecting a said identified cluster node for each said claim report as that best cluster node optimally corresponding with the derived place degree of belonging and date degree of belonging;

generating a tabular claims file compilation incorporating data from each said claim report, each said claim report being associated with said selected identified best cluster node, with said best place degree of belonging and date degree of belonging;

and wherein:

said catastrophic database earth position parameter includes a fuzzy set with principal geographical coordinates and a territorial domain extending a predetermined distance therefrom; and said place degree of belonging is derived in correspondence with the distance between said principal geographical coordinates and said earth location datum, divided by a fuzzy set territorial domain extending a predetermined distance from said geographical coordinates.

38. A method for identifying insurance claims having a relationship with reinsurance related catastrophic events, comprising the steps of:

providing a catastrophic database having identified cluster nodes of catastrophic events derived by reported parameters, each said cluster node having an earth position parameter, and a date of occurrence parameter;

providing an insurance claims database of claim reports, each such claim report thereof having an earth location datum and a date datum;

deriving a place degree of belonging for each said earth location datum of each said claim report with respect to each said cluster node earth position parameter;

deriving a date degree of belonging for each said date datum of each said claims report with respect to each said date of occurrence parameter, said date degree of belonging being derived in correspondence with the time difference between said claim report date datum and said date of occurrence parameter divided by a predetermined fuzzy set time domain value;

selecting a said identified cluster node for each said claim report as that best cluster node optimally corresponding with the derived place degree of belonging and date degree of belonging; and generating a tabular claims file compilation incorporating data from each said claim report, each said claim report being associated with said selected identified best cluster node, with said best place degree of belonging and date degree of belonging.

39. The method of claim 38 in which said time difference is enlarged in value in correspondence with a predetermined tilt factor when said claim report date datum occurs prior in time to said date of occurrence parameter.

* * * * *